US006828370B2

(12) United States Patent
Lan et al.

(10) Patent No.: US 6,828,370 B2
(45) Date of Patent: Dec. 7, 2004

(54) INTERCALATES AND EXFOLIATES THEREOF HAVING AN IMPROVED LEVEL OF EXTRACTABLE MATERIAL

(75) Inventors: Tie Lan, Lake Zurich, IL (US); Vasiliki Psihogios, Palatine, IL (US); Shriram Bagrodia, Kingsport, TN (US); Louis Thomas Germinario, Kingsport, TN (US); John Walker Gilmer, Kingsport, TN (US)

(73) Assignee: AMCOL International Corporation, Arlington Heights, IL (US)

( * ) Notice: Subject to any disclaimer, the term of this patent is extended or adjusted under 35 U.S.C. 154(b) by 202 days.

(21) Appl. No.: 09/870,239

(22) Filed: May 30, 2001

(65) Prior Publication Data

US 2002/0037953 A1 Mar. 28, 2002

Related U.S. Application Data

(60) Provisional application No. 60/207,805, filed on May 30, 2000.

(51) Int. Cl.$^7$ ................................................ C08K 3/34
(52) U.S. Cl. ....................... 524/445; 524/446; 501/145; 501/146
(58) Field of Search ................. 524/186, 445, 524/446, 447, 449; 523/200, 212; 501/145, 148, 149

(56) References Cited

U.S. PATENT DOCUMENTS

| | | | |
|---|---|---|---|
| 2,035,546 A | 3/1936 | Hamilton | ............... 167/24 |
| 2,531,427 A | 11/1950 | Hauser | |
| 2,737,517 A | 3/1956 | Boyd | |
| 2,924,609 A | 2/1960 | Joyce | |
| 2,938,914 A | 5/1960 | Joyce | |
| 2,957,010 A | 10/1960 | Straley et al. | |
| 2,966,506 A | 12/1960 | Jordan | |
| 3,076,821 A | 2/1963 | Hoare | |
| 3,125,586 A | 3/1964 | Katz et al. | |
| 3,232,934 A | 2/1966 | Hoare | |
| 3,281,434 A | 10/1966 | Turetzky et al. | |
| 3,391,164 A | 7/1968 | Straley et al. | |
| 3,419,460 A | 12/1968 | Ure | ............... 161/162 |
| 3,419,517 A | 12/1968 | Hedrick et al. | ............... 260/37 |
| 3,499,916 A | 3/1970 | Berthold | |
| 3,514,498 A | 5/1970 | Okazaki et al. | |
| 3,515,626 A | 6/1970 | Duffield | ............... 161/162 |
| 3,544,523 A | 12/1970 | Maxion | |
| 3,627,625 A | 12/1971 | Jarrett | |
| 3,646,072 A | 2/1972 | Shaw | |
| 3,700,398 A | 10/1972 | Cole, Jr. | |
| 3,725,528 A * | 4/1973 | Banin | ............... 423/112 |
| 3,773,708 A | 11/1973 | Takahashi et al. | ........ 260/41 R |
| 3,792,969 A | 2/1974 | Gertisser | |
| 3,795,650 A | 3/1974 | Burns | ............... 260/33.4 R |
| 3,823,169 A | 7/1974 | Staub | |
| 3,843,479 A | 10/1974 | Matsunami et al. | ........ 161/165 |
| 3,849,406 A | 11/1974 | Basel et al. | |
| 3,876,552 A | 4/1975 | Moynihan | |
| 3,879,283 A | 4/1975 | Mercade | |
| 3,912,532 A | 10/1975 | Simone | ............... 106/308 N |
| 3,929,678 A | 12/1975 | Laughlin et al. | ............... 252/526 |
| 3,929,849 A | 12/1975 | Oswald | ............... 260/448 |
| 3,946,089 A | 3/1976 | Furukawa et al. | .... 260/857 PG |
| 4,018,746 A | 4/1977 | Brinkmann et al. | |
| 4,053,493 A | 10/1977 | Oswald | ............... 260/448 |
| 4,064,112 A | 12/1977 | Rothe et al. | |
| 4,071,503 A | 1/1978 | Thomas et al. | |
| 4,081,496 A | 3/1978 | Finlayson | |
| 4,105,578 A | 8/1978 | Finlayson et al. | |
| 4,116,866 A | 9/1978 | Finlayson | |
| 4,125,411 A | 11/1978 | Lyons | ............... 106/291 |
| 4,133,802 A | 1/1979 | Hachiboshi et al. | ........ 528/502 |
| 4,136,103 A | 1/1979 | Oswald | ............... 260/448 |
| 4,161,578 A | 7/1979 | Herron | |
| 4,163,002 A | 7/1979 | Pohl et al. | |
| 4,208,218 A | 6/1980 | Finlayson | |
| 4,210,572 A | 7/1980 | Herman et al. | ............... 260/404 |
| 4,219,527 A | 8/1980 | Edelman et al. | |
| 4,239,826 A | 12/1980 | Knott, II et al. | |
| 4,251,576 A | 2/1981 | Osborn et al. | ............... 428/331 |
| 4,391,637 A | 7/1983 | Mardis et al. | |
| 4,393,007 A | 7/1983 | Priester et al. | |
| 4,398,642 A | 8/1983 | Okudaira et al. | |
| 4,400,485 A | 8/1983 | Mukamal et al. | ............... 524/444 |
| 4,410,364 A | 10/1983 | Finlayson et al. | |
| 4,412,018 A | 10/1983 | Finlayson et al. | |
| 4,429,079 A | 1/1984 | Shibata et al. | |
| 4,431,755 A | 2/1984 | Weber et al. | ............... 523/203 |

(List continued on next page.)

FOREIGN PATENT DOCUMENTS

| | | |
|---|---|---|
| DE | DT 1 642 122 | 7/1970 |
| DE | 3806548 | 9/1988 |
| DE | 3808623 | 10/1988 |
| DE | 281 585 A5 | 8/1990 |
| EP | 186456 | 7/1986 |
| EP | 0202532 | 11/1986 |
| EP | 0 205 281 A3 | 12/1986 |

(List continued on next page.)

OTHER PUBLICATIONS

Sanchez Camazano, M. et al., "Factors influencing interactions of organophosphorus pesticides with montmorillonite", Chemical Abstracts, vol. 98, No. 98, No. 19, May 9, 1983, Columbus, Ohio, US, Abstract No. 156367.

T. Lan, et al., "Clay–Epoxy Nanocomposites:Relationships Between Reinforcement Properties And The Extent Of Clay Exfoliation", Polym. Mater. Sc. Eng., 73, pp. 296–297 (1995).

A. Okada, et al., "A Solid State NMR Study On Crystalline Forms Of Nylon 6", Journal of Applied Polymer Science, (1989), vol. 37, pp. 1363–1371.

(List continued on next page.)

Primary Examiner—Katarzyna Wyrozebski
(74) Attorney, Agent, or Firm—Marshall, Gerstein & Borun LLP

(57) ABSTRACT

The invetion is directed to a polymer-clay nanocomposite material comprising a melt-processible matrix oplymer and a layered clay material having decreased levels of extractable material, such as extractible salts of organic cations. This invention is also derected to processes for preparing polymer-clay nanocomposites, intercalates, exfoliates, and articles or products produced from nanocomposite materials.

21 Claims, No Drawings

U.S. PATENT DOCUMENTS

| | | |
|---|---|---|
| 4,434,075 A | 2/1984 | Mardis et al. ............ 252/315.2 |
| 4,434,076 A | 2/1984 | Mardis et al. |
| 4,442,163 A | 4/1984 | Kühner et al. |
| 4,450,095 A | 5/1984 | Finlayson |
| 4,472,538 A | 9/1984 | Kamigaito et al. ......... 523/202 |
| 4,482,695 A | 11/1984 | Barbee et al. |
| 4,500,670 A | 2/1985 | McKinley et al. .......... 524/445 |
| 4,517,112 A | 5/1985 | Mardis et al. |
| 4,536,425 A | 8/1985 | Hekal |
| 4,546,126 A | 10/1985 | Breitenfellner et al. ..... 523/216 |
| 4,546,145 A | 10/1985 | Kishida et al. ............. 524/780 |
| 4,595,715 A | 6/1986 | Kuze et al. |
| 4,600,409 A | 7/1986 | Campbell |
| 4,600,744 A | 7/1986 | Libor et al. ................. 524/446 |
| 4,613,542 A | 9/1986 | Alexander ................. 428/290 |
| 4,624,982 A | 11/1986 | Alexander ................. 524/446 |
| 4,646,925 A | 3/1987 | Nohara |
| 4,676,929 A | 6/1987 | Rittler ..................... 252/315.2 |
| 4,677,158 A | 6/1987 | Tao et al. |
| 4,680,208 A | 7/1987 | Aoki et al. |
| 4,720,420 A | 1/1988 | Crass et al. |
| 4,725,466 A | 2/1988 | Crass et al. |
| 4,739,007 A | 4/1988 | Okada et al. ............... 524/789 |
| 4,742,098 A | 5/1988 | Finlayson et al. |
| 4,769,078 A | 9/1988 | Tso |
| 4,777,206 A | 10/1988 | Rittler ....................... 524/445 |
| 4,789,403 A | 12/1988 | Rice ........................... 106/417 |
| 4,798,766 A | 1/1989 | Rice ........................... 428/404 |
| 4,810,734 A | 3/1989 | Kawasumi et al. ......... 523/216 |
| 4,842,651 A | 6/1989 | Ravet et al. ............... 106/487 |
| 4,849,006 A | 7/1989 | Knudson, Jr. .............. 71/64.11 |
| 4,851,021 A | 7/1989 | Bohrn et al. ................... 65/17 |
| 4,875,762 A | 10/1989 | Kato et al. ................. 350/357 |
| 4,889,885 A | 12/1989 | Usuki et al. ................ 524/443 |
| 4,894,411 A | 1/1990 | Okada et al. ............... 524/710 |
| 4,920,171 A | 4/1990 | Hutton, Jr. et al. ......... 524/446 |
| 4,946,365 A | 8/1990 | Kudert et al. |
| 4,956,121 A | 9/1990 | Tymon et al. .......... 252/378 R |
| 4,957,980 A | 9/1990 | Kobayashi et al. |
| 4,983,432 A | 1/1991 | Bissot |
| 4,983,719 A | 1/1991 | Fox et al. |
| 4,994,313 A | 2/1991 | Shimizu et al. |
| 5,028,351 A | 7/1991 | Kato et al. ................ 252/315.2 |
| 5,028,462 A | 7/1991 | Matlack et al. |
| 5,032,546 A | 7/1991 | Giannelis et al. .............. 501/3 |
| 5,032,547 A | 7/1991 | Giannelis et al. .............. 501/3 |
| 5,034,252 A | 7/1991 | Nisson et al. |
| 5,037,285 A | 8/1991 | Kudert et al. |
| 5,091,462 A | 2/1992 | Fukui et al. ................. 524/504 |
| 5,102,948 A | 4/1992 | Deguchi et al. ............. 524/789 |
| 5,110,501 A | 5/1992 | Knudson, Jr. et al. |
| 5,134,987 A | 8/1992 | Mayer et al. |
| 5,149,485 A | 9/1992 | Belcher |
| 5,153,061 A | 10/1992 | Cavagna et al. |
| 5,153,062 A | 10/1992 | Grolig et al. |
| 5,164,440 A | 11/1992 | Deguchi et al. ............. 524/444 |
| 5,164,460 A | 11/1992 | Yano et al. ................. 624/460 |
| 5,204,078 A | 4/1993 | Tateyama et al. ........... 423/331 |
| 5,206,284 A | 4/1993 | Fukui et al. ................. 524/504 |
| 5,221,507 A | 6/1993 | Beck et al. |
| 5,229,451 A | 7/1993 | Carter et al. ................ 524/493 |
| 5,248,720 A | 9/1993 | Deguchi et al. ............. 524/444 |
| 5,273,706 A | 12/1993 | Laughner |
| 5,326,500 A | 7/1994 | Friedman et al. ........... 252/378 |
| 5,334,241 A | 8/1994 | Jordan |
| 5,336,647 A | 8/1994 | Naé et al. |
| 5,340,558 A | 8/1994 | Friedman et al. ........ 423/328.1 |
| 5,340,884 A | 8/1994 | Mills et al. |
| 5,374,306 A | 12/1994 | Schlegel et al. |
| 5,382,650 A | 1/1995 | Kasowski et al. |
| 5,385,776 A | 1/1995 | Maxfield et al. ............. 428/297 |
| 5,391,437 A | 2/1995 | Miyasaka et al. ......... 528/425.5 |
| 5,414,042 A | 5/1995 | Yasue et al. ................. 524/789 |
| 5,428,094 A | 6/1995 | Tokoh et al. ................ 524/379 |
| 5,429,999 A | 7/1995 | Naé et al. |
| 5,434,000 A | 7/1995 | Konagaya et al. |
| 5,506,046 A | 4/1996 | Andersen et al. ........... 524/446 |
| 5,508,072 A | 4/1996 | Andersen et al. ........... 524/446 |
| 5,514,734 A | 5/1996 | Maxfield et al. ............. 523/204 |
| 5,523,045 A | 6/1996 | Kudert et al. |
| 5,530,052 A | 6/1996 | Takekoshi et al. |
| 5,552,469 A | 9/1996 | Beall et al. .................. 524/445 |
| 5,554,670 A | 9/1996 | Giannelis et al. ........... 523/209 |
| 5,578,672 A | 11/1996 | Beall et al. .................. 624/446 |
| 5,612,138 A | 3/1997 | Kurz et al. |
| 5,620,774 A | 4/1997 | Etchu et al. |
| 5,648,159 A | 7/1997 | Sato |
| 5,659,034 A | 8/1997 | DeBord et al. ................. 546/2 |
| 5,660,761 A | 8/1997 | Katsumoto et al. |
| 5,665,454 A | 9/1997 | Hosoi et al. |
| 5,667,886 A | 9/1997 | Gough et al. ................ 428/331 |
| 5,698,624 A | 12/1997 | Beall et al. .................. 524/445 |
| 5,721,306 A | 2/1998 | Tsipursky et al. ........... 524/449 |
| 5,728,764 A | 3/1998 | Bauer et al. |
| 5,730,996 A | 3/1998 | Beall et al. .................. 424/405 |
| 5,747,403 A | 5/1998 | Boyd et al. .................... 502/62 |
| 5,747,560 A | 5/1998 | Christiani et al. ........... 523/209 |
| 5,760,106 A | 6/1998 | Pinnavaia et al. ........... 523/209 |
| 5,760,121 A | 6/1998 | Beall et al. .................. 524/450 |
| 5,766,751 A | 6/1998 | Kotani et al. ................ 428/323 |
| 5,780,376 A | 7/1998 | Gonzales et al. |
| 5,801,216 A | 9/1998 | Pinnavaia et al. ........... 523/209 |
| 5,804,613 A | 9/1998 | Beall et al. .................. 523/200 |
| 5,830,528 A | 11/1998 | Beall et al. .................. 427/220 |
| 5,830,544 A | 11/1998 | Kerscher et al. |
| 5,834,391 A * | 11/1998 | Pinnavaia et al. ............. 502/62 |
| 5,837,763 A | 11/1998 | Ferraro et al. ............... 524/449 |
| 5,844,032 A | 12/1998 | Serrano et al. .............. 524/445 |
| 5,849,830 A | 12/1998 | Tsipursky et al. ........... 524/450 |
| 5,853,886 A | 12/1998 | Pinnavaia et al. ........... 428/403 |
| 5,876,812 A | 3/1999 | Frisk et al. |
| 5,877,248 A | 3/1999 | Beall et al. .................. 524/450 |
| 5,880,197 A | 3/1999 | Beall et al. .................. 524/445 |
| 5,882,751 A | 3/1999 | Occhiello et al. |
| 5,910,523 A | 6/1999 | Hudson ....................... 523/213 |
| 5,916,685 A | 6/1999 | Frisk et al. |
| 5,942,320 A | 8/1999 | Miyake et al. |
| 5,952,093 A | 9/1999 | Nicholas et al. |
| 5,952,095 A | 9/1999 | Beall et al. .................. 428/332 |
| 5,955,094 A | 9/1999 | Beall et al. .................. 424/405 |
| 5,972,448 A | 10/1999 | Frisk et al. |
| 5,981,029 A | 11/1999 | Harada et al. ............... 428/143 |
| 5,993,769 A | 11/1999 | Pinnavaia et al. |
| 5,994,445 A | 11/1999 | Kaschel et al. .............. 524/444 |
| 5,998,528 A | 12/1999 | Tsipursky et al. ........... 524/445 |
| 6,017,632 A | 1/2000 | Pinnavaia et al. |
| 6,034,163 A | 3/2000 | Barbee et al. ............... 524/445 |
| 6,036,765 A | 3/2000 | Farrow et al. |
| 6,050,509 A | 4/2000 | Clarey et al. .................. 241/21 |
| 6,057,396 A | 5/2000 | Lan et al. .................... 524/445 |
| 6,060,549 A | 5/2000 | Li et al. |
| 6,071,988 A | 6/2000 | Barbee et al. ............... 523/210 |
| 6,083,559 A | 7/2000 | Beall et al. .................. 427/220 |
| 6,084,019 A | 7/2000 | Matayabas, Jr. et al. .... 524/445 |
| 6,090,734 A | 7/2000 | Tsipursky et al. ........... 501/141 |
| 6,117,541 A | 9/2000 | Frisk |
| 6,120,860 A | 9/2000 | Bowen et al. |
| 6,124,365 A | 9/2000 | Lan et al. .................... 516/101 |
| 6,126,734 A | 10/2000 | Beall et al. .................. 106/487 |
| 6,156,835 A | 12/2000 | Anderson et al. |
| 6,162,857 A | 12/2000 | Trexler et al. |

| | | | |
|---|---|---|---|
| 6,225,394 B1 | 5/2001 | Lan et al. | 524/445 |
| 6,228,903 B1 | 5/2001 | Beall et al. | 523/209 |
| 6,232,388 B1 | 5/2001 | Lan et al. | 524/445 |
| 6,235,533 B1 | 5/2001 | Tsipursky et al. | 436/72 |
| 6,242,500 B1 | 6/2001 | Lan et al. | 516/101 |
| 6,251,980 B1 | 6/2001 | Lan et al. | 524/445 |
| 6,254,803 B1 | 7/2001 | Matthews et al. | |
| 6,262,162 B1 | 7/2001 | Lan et al. | 524/445 |
| 6,287,634 B1 | 9/2001 | Beall et al. | 427/220 |
| 6,384,121 B1 * | 5/2002 | Barbee et al. | 524/445 |
| 2002/0098309 A1 * | 7/2002 | Bragodia et al. | 428/36.9 |

FOREIGN PATENT DOCUMENTS

| | | |
|---|---|---|
| EP | 261430 | 3/1988 |
| EP | 278403 | 8/1988 |
| EP | 295336 | 12/1988 |
| EP | 0 335 653 A1 | 10/1989 |
| EP | 0 358 415 A1 | 3/1990 |
| EP | 398551 | 11/1990 |
| EP | 459472 | 12/1991 |
| EP | 0 479 031 A1 | 4/1992 |
| EP | 542266 | 5/1993 |
| EP | 0 548 940 A1 | 6/1993 |
| EP | 0590263 | 4/1994 |
| EP | 0 619 182 A1 | 10/1994 |
| EP | 0 645 181 A2 | 3/1995 |
| EP | 650994 | 5/1995 |
| EP | 0691212 | 1/1996 |
| EP | 0691376 | 1/1996 |
| EP | 681990 | 11/1996 |
| EP | 0 747 451 A2 | 12/1996 |
| EP | 0 761 739 A1 | 3/1997 |
| EP | 0 780 340 A1 | 6/1997 |
| EP | 0822163 | 2/1998 |
| EP | 0846723 | 6/1998 |
| EP | 0909787 | 4/1999 |
| EP | 940430 | 9/1999 |
| GB | 1090036 | 11/1967 |
| GB | 1 146 668 | 3/1969 |
| GB | 1 565 362 | 4/1980 |
| GB | 2 088 932 A | 6/1982 |
| GB | 2123014 | 1/1984 |
| JP | 75001156 | 1/1975 |
| JP | 50029697 | 3/1975 |
| JP | 75005735 | 3/1975 |
| JP | 75005751 | 3/1975 |
| JP | 75010196 | 4/1975 |
| JP | 62073943 | 4/1987 |
| JP | 7026123 | 1/1995 |
| JP | 09048908 | 2/1997 |
| JP | 9176461 | 7/1997 |
| JP | 9217012 | 8/1997 |
| JP | 10001608 | 1/1998 |
| JP | 10077427 | 3/1998 |
| JP | 10133013 | 5/1998 |
| JP | 10158305 | 5/1998 |
| WO | WO 84/03096 | 8/1984 |
| WO | WO 93/04117 | 3/1993 |
| WO | WO 93/04118 | 3/1993 |
| WO | WO 93/11190 | 6/1993 |
| WO | WO 93/14922 | 8/1993 |
| WO | WO 94/11430 | 5/1994 |
| WO | WO 94/29378 | 12/1994 |
| WO | WO 95/06090 | 3/1995 |
| WO | WO 95/14733 | 6/1995 |
| WO | WO 96/08526 | 3/1996 |
| WO | WO 96/25458 | 8/1996 |
| WO | WO 97/02323 | 1/1997 |
| WO | WO 97/17398 | 5/1997 |
| WO | WO 97/30950 | 8/1997 |
| WO | WO 97/31057 | 8/1997 |
| WO | WO 97/31973 | 9/1997 |
| WO | WO 97/44384 | 11/1997 |
| WO | WO 98/01346 | 1/1998 |
| WO | WO 98/01346 | 5/1998 |
| WO | WO 98/29499 | 7/1998 |
| WO | WO 98/53000 | 11/1998 |
| WO | WO 99/02593 | 1/1999 |
| WO | WO 99/15432 | 4/1999 |
| WO | WO 99/38914 | 8/1999 |
| WO | WO 99/41299 | 8/1999 |
| WO | WO 00/34377 | 6/2000 |
| WO | WO 00/34378 | 6/2000 |
| WO | WO 00/34393 | 6/2000 |

OTHER PUBLICATIONS

A. Usuki, et al., Swelling Behavior Of Montmorillonite Cation Exchanged For ω–Amino Acids By ε–Caprolactam, J. Mater. Res.; vol. 8, No. 5, May 1993, pp. 1174–1178.

Y. Kojima, et al., "One–Pot Synthesis Of Nylon 6–Clay Hybrid", Journal of Polymer Science: Part A: Polymer Chemistry, vol. 31, (1993), pp. 1755–1758.

Y. Kojima, et al., "Fine Structure Of Nylon–6–Clay Hybrid", Journal of Polymer Science: Part B: Polymer Physics, vol. 32 (1994), pp. 625–630.

B.K.G. Theng, "Clay–Polymer interactions: SumGomary And Perspectives", Clays and Clay Minerals, vol. 30, No. 1 (1982) pp. 1–9.

Sugahara, et al., "Clay–Organic Nano–Composite; Preparation of a Kaolinite–Poly(vinylpyrrolidone) Intercalation Compound", *Journal of the Ceramic Society of Japan*, International Edition, vol. 100, No. 4, Apr. 1, 1992, pp. 420–423.

Ogawa, et al., "Preparation Of Montmorillonite–Polyacrylamide Intercalation Compounds And The Water Absorbing Property", *Clay Science*, vol. 7, 1989. Tokyo, Japan, pp. 243–251.

Wu, et al., "Structural, thermal, and electrical characterization of layered nanocomposites derived from sodium–montmorillonite and polyethers", Chemical Abstracts, vol. 119, No. 4, Jul. 26, 1993 Columbus, Ohio, US, Abstract No. 31017r.

Bujdak, et al., "The reaction of montmorillonite with octadecylamine in solid and melted state", Chemical Abstracts, vol. 118, No. 26, Abstract No. 257609b, p. 166 (Jun. 28, 1993), Columbus, Ohio (US).

Yano, et al., "Synthesis And Properties Of Polyimide–Clay Hybrid", Polymer Preprints, ACS, Apr. 1991, pp. 65–66.

Giannelis, et al., "Synthesis And Processing Of Ceramics: Scientific Issues", Materials Research Society Symposium Proceedings, vol. 249 (1992), pp. 547–558.

C. W. Francis, "Adsorption of Polyvinylpyrrolidone on Reference Clay Minerals", Soil Science, vol. 115, No. 1, 1973, pp. 40–54.

A. Usuki, et al., "Synthesis of nylon 6–clay hybrid", J. Mater. Res., vol. 8, No. 5, May 1993, pp. 1179–1184.

Y. Kojima, et al., "Mechanical Properties Of Nylon 6–Clay Hybrid", J. Mater. Res., vol. 8, No. 5, May 1993, pp. 1185–1189.

K. Suzuki, et al., "Preparation Of Delaminated Clay Having A Narrow Micropore Distribution In The Presence Of Hydroxyaluminum Cations And Polyvinyl Alcohol", Clays and Clay Minerals, vol. 36, No. 2, 1988, pp. 147–152.

R. Levy, et al., "Interlayer Adsorption of Polyvinylpyrrolidone On Montmorillonite", Journal of Colloid and Interface Science, vol. 50, No. 3, Mar. 1975, pp. 442–450.

D.J. Greenland, "Adsorption Of Polyvinyl Alcohols By Montmorillonite", Journal of Colloid Science, 18, (1963) pp. 647–664.

R.A. Vaia, et al., "Synthesis and Properties of Two–Dimensional Nanostructures by Direct Intercalation of Polymer Melts in Layered Silicates", Chem. Mater. 1993, 5, pp. 1694–1696.

R.A. Vaia, et al., "New Polymer Electrolyte Nanocomposites: Melt Intercalation of Poly(ethylene oxide) in Mica–Type Silicates", Advanced Materials 1995, 7, No. 2, pp. 154–156.

A. Akelah, et al., "Synthesis and Characterization of Epoxyphilic montmorillonites", Clay Minerals (1994) 29, pp. 169–178.

C.E. Clapp, et al., "Adsorption Studies Of A Dextran On Montmorillonite", Trans. 9th Int. Cong. Soil Sci., 1968, vol. 1, pp. 627–634.

H.G.G. Dekking, "Preparation And Properties Of Some Polymer–Clay Compounds", Clays and Clay Minerals, 1964, 12, pp. 603–616.

A. Usuki, et al., "Characterization and Properties of Nylon 6—Clay Hybrid", (source and date unknown), pp. 651–652.

G.W. Brindley, et al., "Preparation And Solvation Properties Of Some Variable Charge Montmorillonites", Clays and Clay Minerals, 1971, vol. 18, pp. 399–404.

LeBaron et al., "Polymer–layered silicate nanocomposites: an overview," *App. Clay Sci.*, 15, 11–29 (1999).

Ke et al., "Crystallization, Properties, and Crystal and Nanoscale Morphology of PET–Clay Nanocomposites," *J. Appl. Polym. Sci.*, 71, 1139–1146 (1999).

Kawasumi et al., "Preparation and Mechanical Properties of Polypropylene–Clay Hybrids," Macromolecules, 30, 6333–6338 (1997).

Usuki et al., "Synthesis of Propylene–Clay Hybrid", *J. Appl. Polym. Sci.*, 63, 137–139 (1997).

Giannelis, "Polymer Layered Silicate Nanocomposites," Advanced Materials, 8, 29–35 (1996).

Kurowaka et al., "Preparation of a nanocomposite of polypropylene and snmectite." *J. Materials Science Letters*, 15 1481–1483 (1996).

Oriakhi et al., "Incorporation of poly(acrylic acid), poly(vinylsulfonate) and poly(styrenesulfonate) within layered double hydroides," *J. Mater. Chem.*, 6, 103–107 (1996).

Messersmith et al., "Syntheses and Barrier Properties of Poly($\Delta$–Caprolactone)–Layered Silicate Nanocomposites," *J. of Polym. Sci.*, 33, 1047–1057 (1995).

Pinnavaia et al., "Clay–reinforced Epoxy Nanocomposites," *Chem. Mater.*, 6, 2216–2219 (1994).

Fukushima et al., "Swelling Behavior of Montmorillonite by Poly–6–Amide," *Clay Minerals*, 23, 27–34 (1988).

Verbicky, *Encyclopedia of Polymer Science and Engineering*, $2^{nd}$ Edition, 12, 364–383 (1988).

Fukushima et al., "Synthesis of an intercalated Compound of Montmorillonite and 6–Polyamide," *J. Inclusion Phenomena*, 5, 473–482, (1987).

Okada et al., "Synthesis and Characterization of a Nylon 6–Clay Hybrid," *ACS, Polymer Preprints*, 28, 447–448, (1987).

Fahn et al., "Reaction Products of Organic Dye Molecules with Acid–Treated Montmorillonite," *Clay Minerals*, 18, 447–458 (1983).

\* cited by examiner

US 6,828,370 B2

INTERCALATES AND EXFOLIATES THEREOF HAVING AN IMPROVED LEVEL OF EXTRACTABLE MATERIAL

RELATED APPLICATION

This application claims priority to provisional patent application Ser. No. 60/207,805, filed May 30, 2000, which is incorporated herein by this reference in its entirety.

FIELD OF THE INVENTION

The present invention relates generally to polymer-clay nanocomposites comprising a matrix polymer and a layered clay material having an improved level of extractable materials. The polymer-clay nanocomposites comprising the layered clay material may be processed under normal conditions while providing low haze and improved oxygen barrier properties. This invention further relates to articles produced from the polymer-clay nanocomposites and processes relating to the nanocomposites.

BACKGROUND OF THE INVENTION

Thermoplastic materials are being increasingly used in the packaging of beverages and perishable foods. Plastics are often the material of choice for food and beverage packaging because of their clarity, flexibility, toughness, gas barrier properties, lighter weight, processability and high gloss. Polymer nanocomposites comprising a layered clay material having platelet particles dispersed therein have the potential for improved properties, including increased gas barrier, heat deflection temperature, and modulus.

Nevertheless, platelet particles derived from layered clay materials dispersed in a polymer nanocomposite may also induce crystallization and void formation during melt processing operations, such as the stretching or orientation of films. This may lead to very high levels of haze, and/or degradation of the gas barrier properties of the films made from nanocomposite materials, which renders the nanocomposites less desirable for food packaging applications, for example. Similar phenomena observed during the use of prior art nanocomposite materials in stretch blow molding applications can even lead to void and hole formation in the polymer films, which generally minimizes the usefulness of these compositions in high barrier applications.

Certain salts of organic cations have been used in the prior art to intercalate and/or cation exchange the layered clay materials used to make the nanocomposites. It has been taught in the prior art to use excess quantities of the salts of the organic cations when intercalating the layered clay material to facilitate complete cation exchange in the layered clay material, and thereby facilitate dispersion of the clay into various carrier materials to provide the desired individual platelet particles. As a result, intercalated layered clay materials in the prior art may be contaminated with the salts of the organic cations used as starting materials to intercalate and/or ion-exchange the layered clay material. It would be beneficial for some applications to provide an intercalated layered clay material with improved levels of certain extractable materials, such as extractable salts of organic cations.

SUMMARY OF THE INVENTION

The present invention is generally related to polymer-clay nanocomposites. The nanocomposites and/or intercalated layered clay materials of this invention result in improved physical properties as a result of the incorporation therein of a layered clay material comprising platelet particles. The layered clay material may be treated or modified with an organic cation to form an organoclay. A reduced level of permeability of gases, such as oxygen and carbon dioxide, through the nanocomposite material, and improved transparency of the nanocomposite may be achieved by employing a layered clay material having an improved level of certain extractable materials, such as certain salts of organic cations that are used to prepare the layered clay material.

Additional advantages of the invention will be set forth in part in the detailed description, which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory of preferred embodiments of the invention, and are not restrictive of the invention, as claimed.

DETAILED DESCRIPTION OF THE INVENTION

The present invention may be understood more readily by reference to the following detailed description of the invention and the examples provided therein. It is to be understood that this invention is not limited to the specific components, articles, processes and/or conditions described, as these may, of course, vary. It is also to be understood that the terminology used herein is for the purpose of describing particular embodiments only and is not intended to be limiting.

It must also be noted that, as used in the specification and the appended claims, the singular forms "a," "an" and "the" include plural referents unless the context clearly dictates otherwise. For example, reference to an "article," "container" or "bottle" prepared from the nanocomposites and processes of this invention is intended to include a plurality of articles, containers or bottles.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Whenever used in this specification, the terms set forth shall have the following meanings:

"Layered clay material," "layered clay," "layered material," "clay material" or "clay" shall mean any organic or inorganic material or mixtures thereof, such as a smectite clay mineral, which is in the form of a plurality of adjacent, bound layers. The layered clay comprises platelet particles and is typically swellable.

"Platelets," "platelet particles" or "particles" shall mean individual or aggregate unbound layers of the layered clay material. These layers may be in the form of individual platelet particles, ordered or disordered small aggregates of platelet particles (tactoids), and/or small aggregates of tactoids.

"Dispersion" or "dispersed" is a general term that refers to a variety of levels or degrees of separation of the platelet particles. The higher levels of dispersion include, but are not limited to "intercalated" and "exfoliated."

"Intercalated" or "intercalate" shall mean a layered clay material that includes treated or organically modified layered clay material having an increase in the interlayer spacing between adjacent platelets particles and/or tactoids. The intercalate may also be referred to as an "organoclay."

"Exfoliate" or "exfoliated" shall mean platelets dispersed mostly in an individual state throughout a carrier material, such as a matrix polymer. Typically, "exfoliated" is used to denote the highest degree of separation of platelet particles.

"Exfoliation" shall mean a process for forming an exfoliate from an intercalated or otherwise less dispersed state of separation.

"Nanocomposite" shall mean a polymer and/or copolymer having dispersed therein a plurality of individual platelets obtained from a layered clay material.

"Matrix polymer" shall mean a thermoplastic or thermosetting polymer in which the clay material is dispersed to form a nanocomposite.

A weight percent of a component, unless specifically stated to the contrary, is based on the total weight of the formulation or composition in which the component is included.

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —OCH2CH2O— repeat units in the polyester, regardless of whether ethylene glycol is used to prepare the polyester.

The term "alkyl" as used herein refers to a branched or unbranched saturated hydrocarbon group of 1 to 22 carbon atoms, such as methyl, ethyl, n-propyl, isopropyl, n-butyl, isobutyl, t-butyl, octyl, decyl, tetradecyl, hexadecyl, octadecyl and the like.

The term "lower alkyl" intends an alkyl group of one to four carbon atoms.

The present invention relates to polymer-clay nanocomposites that have improved physical properties afforded by the incorporation of clay platelet particles obtained from layered clay materials having low and/or decreased levels of certain extractable materials. The nanocomposites of the invention may exhibit unexpectedly reduced haze and void levels, and thereby produce unexpectedly improved gas barrier properties in certain applications.

In accordance with the invention herein, it has been found that the excess salts of the organic cations that often remain in the intercalated layered clay materials taught by the prior art are thermally unstable at the temperature of the molten matrix polymers used to form the nanocomposites of the present invention. Without being bound by any particular theory, it is believed that the thermal decomposition of the excess salts of the organic cations may lead to the formation of volatile organic compounds and/or acids (including hydrohalic acids such as HCl). If even relatively small excess quantities of extractible materials, including the salts of the organic cation salts, remain in contact with the intercalated layered clay material, and are incorporated into the nanocomposites, volatilization and/or thermal degradation reactions can lead to degradation of the molecular weight of the matrix polymer, the formation of gases and/or voids and/or discoloration. The voids and/or discoloration can severely reduce the gas barrier properties, transparency, and haze of the resulting nanocomposite, and any articles derived therefrom. Thus, it is desirable to provide nanocomposite materials that are substantially free from extractable materials such as extractable salts of organic cations.

Thus, in some aspects, the present invention relates to a polymer-clay nanocomposite comprising:
  a) a matrix polymer, and
  b) platelets dispersed in the matrix polymer that are obtained from a layered clay material having exchangeable cations in the layered clay material,
wherein the exchangeable cations consist essentially of one or more organic cations, and the layered clay material is substantially free of extractable salts of the organic cations.

Polymers

Any matrix polymer or oligomeric resin may be used in this invention. Matrix polymers are those polymers having chemical structures and physical properties permitting the dispersal of compatible platelet particles therein, so as to form a substantially homogeneous mixture of the polymer molecules and the platelet particles on the molecular or macromolecular scale. Matrix polymers may be heated to form fluid melts, or may be dissolved in one or more solvents, so as to aid the dispersal of the platelet particles therein. Highly cross-linked polymers which cannot be dissolved or melted without decomposition are typically not considered to be matrix polymers.

In one aspect, the matrix polymers and/or or oligomeric resins may be melt processable. Melt processable matrix polymers or oligomeric resins have sufficient chemical and thermal stability that they may be maintained at the temperature of their fluid melts for an adequate time, and have a melt viscosities that are suitable, so as to permit successful processing by the various melt processing methods known by those of skill in the polymer arts. Those melt processing methods include but not limited to compounding and/or mixing operations, molding, or extrusion, and other article forming operations.

Illustrative of matrix polymers are polyesters, polyetheresters, polyamides, polyesteramides, polyurethanes, polyimides, polyetherimides, polyureas, polyamideimides, polyphenyleneoxides, phenoxy resins, epoxy resins, polyolefins, polyacrylates, polystyrenes, polyethylene-co-vinyl alcohols (EVOH), and the like or their combinations and blends. Although the matrix polymers utilized herein may be linear or nearly linear, matrix polymers with other architectures, including branched, star, cross-linked and dendritic structures may be used if desired.

The matrix polymers herein may include those materials that are suitable for use in the formation of monolayer and/or multilayer structures with polyesters and can be oriented, and include polyesters, polyamides, polyethylene-co-vinyl alcohols (such as EVOH), and similar or related polymers and/or copolymers. A polyester may be poly(ethylene terephthalate) (PET), or a copolymer thereof. One polyamide may be poly(m-xylylene adipamide) or a copolymer thereof.

Suitable polyesters may include at least one dibasic acid and at least one glycol. A polyester of this invention may comprise the polycondensation polymerization reaction product (or residue) of the glycol component and the dicarboxylic acid component.

The primary dibasic acids used to produce polyesters include terephthalic, isophthalic, naphthalenedicarboxylic, 1,4-cyclohexanedicarboxylic acid and the like. The various isomers of naphthalenedicarboxylic acid or mixtures of isomers may be used, including but not limited to the 1,4-, 1,5-, 2,6-, and 2,7-isomers. The 1,4-cyclohexanedicarbxoylic acid may be in the form of cis, trans, or cis/trans mixtures. In addition to the acid forms, the lower alkyl esters or acid chlorides may be also be used.

The dicarboxylic acid component of the polyester may optionally be modified with up to about 50 mole percent of one or more different dicarboxylic acids. Such additional dicarboxylic acids include dicarboxylic acids having from 6 to about 40 carbon atoms, or dicarboxylic acids selected from aromatic dicarboxylic acids preferably having from 8 to 14 carbon atoms, aliphatic dicarboxylic acids preferably having from 4 to 12 carbon atoms, or cycloaliphatic dicarboxylic acids preferably having from 8 to 12 carbon atoms. Examples of suitable dicarboxylic acids include phthalic acid, isophthalic acid, terephthalic acid, naphthalene-2,6-dicarboxylic acid, cyclohexanedicarboxylic acid, cyclohexanediacetic acid, diphenyl-4,4'-dicarboxylic acid, phenylenedi(oxyacetic acid), succinic acid, glutaric acid, adipic acid, azelaic acid, sebacic acid, and the like. Polyesters may also be prepared from one or more of the above dicarboxylic acids.

Glycols used in the polyesters may include those containing from two to about ten carbon atoms. Preferred glycols include ethylene glycol, propanediol, 1,4-butanediol, 1,6-hexanediol, 1,4-cyclohexanedimethanol, diethylene glycol and the like. The glycol component may optionally be modified with up to about 50 mole percent, preferably up to about 25 mole percent, or up to about 15 mole percent of one or more different diols. Such additional diols may include cycloaliphatic diols having from 6 to 20 carbon atoms or aliphatic diols preferably having from 3 to 20 carbon atoms. Examples of such diols may include: diethylene glycol, triethylene glycol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(2-hydroxyethoxy)-benzene, 2,2b-is-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane and the like. When using 1,4-cyclohexanedimethanol, it may be the cis, trans or cis/trans mixtures. When using phenylenedi(oxyacetic acid), it may be used as 1,2; 1,3; 1,4 isomers, or mixtures thereof. Polyesters may be prepared from one or more of the above diols.

Small amounts of multifunctional polyols such as trimethylolpropane, pentaerythritol, glycerol and the like may be used, to form branched polyesters, if desired. The other polymers of the invention may also contain small amounts of trifunctional or tetrafunctional comonomers to provide controlled branching in the polymers. Such comonomers include trimellitic anhydride, trimethylolpropane, pyromellitic dianhydride, pentaerythritol, trimellitic acid, trimellitic acid, pyromellitic acid and other polymer forming polyacids, polyamines or polyols generally known in the art.

The polyesters of the present invention may exhibit an I.V. of from about 0.25 to about 1.5 dL/g, or from about 0.4 to about 1.2 dL/g, and/or from about 0.7 to about 0.9 dL/g. The I.V. is measured at 25° C. in a 60/40 by weight mixture in phenol/tetrachloroethane at a concentration of 0.5 grams per 100 ml. Polyesters having an I.V. within the ranges specified above are of sufficiently high molecular weight to be used in the formation of the articles of the present invention.

The polyesters, polyamides and other matrix polymers of the invention are generally prepared by processes which are well known in the art.

A polyamide of the present invention may comprise the polycondensation polymerization reaction product (or residue) of a diamine component and a dicarboxylic acid component, the self-condensation of amino acids and/or or their derivatives, and/or those prepared by ring opening polymerization of lactams. "Residue," when used in reference to the components of the polyamide of this invention, refers to the moiety that is the resulting product of the chemical species in a particular reaction scheme, or subsequent formulation or chemical product, regardless of whether the moiety is actually obtained from the chemical species.

Suitable polyamides include partially aromatic polyamides, aliphatic polyamides, wholly aromatic polyamides and/or mixtures thereof. By "partially aromatic polyamide," it is meant that the amide linkage of the partially aromatic polyamide contains at least one aromatic ring and a nonaromatic species. Suitable polyamides may have an article forming molecular weight and an I.V. of greater than 0.4.

Polyamides may be formed from monomeric precursors, including diacids such such as isophthalic acid, terephthalic acid, cyclohexanedicarboxylic acid, aliphatic or cylcoaliphatic diacids with from 4 to 12 carbon atoms, or from 6 to 12 carbon atoms, aliphatic diamines with 4 to 12 carbon atoms, aromatic diamines having from 6 to 18 carbon atoms, and diamines having both aromatic and aliphatic resides, including meta- or para-xylylene diamine, 1,3- or 1,4-cyclohexane(bis)methylamine, aliphatic amino acids or lactams with 6 to 12 carbon atoms, and other generally known polyamide forming diacids and diamines can be used. The polyamides may also contain small amounts of trifunctional or tetrafunctional comonomers such as trimellitic anhydride, pyromellitic dianhydride, or other polyamide forming polyacids and polyamines known in the art.

Polyamides may comprise in the molecule chain at least 70 mole% of structural units derived from m-xylylene diamine or a xylylene diamine mixture comprising m-xylylene diamine and up to 30% of p-xylylene diamine and an aliphatic dicarboxylic acid having 6 to 10 carbon atoms, which are further described in Japanese Patent Publications No. 1156/75, No. 5751/75, No. 5735/75 and No. 10196/75 and Japanese Patent Application Laid-Open Specification No. 29697/75, which are hereby incorporated herein by reference, in their entireties.

Preferred partially aromatic polyamides include, but are not limited to poly(m-xylylene adipamide), poly(m-xylylene adipamide-co-isophthalamide), poly(hexamethylene isophthalamide), poly(hexamethylene isophthalamide-co-terephthalamide), poly(hexamethylene adipamide-co-isophthalamide), poly(hexamethylene adipamide-co-terephthalamide), poly(hexamethylene isophthalamide-co-terephthalamide) and the like or mixtures thereof. More preferred partially aromatic polyamides may include, but are not limited to poly(m-xylylene adipamide), poly (hexamethylene isophthalamide-co-terephthalamide), poly (m-xylylene adipamide-co-isophthalamide), and/or mixtures thereof. A particular partially aromatic polyamide is poly(m-xylylene adipamide).

Aliphatic polyamides may include, but are not limited to poly(hexamethylene adipamide) and poly(caprolactam). A particular aliphatic polyamide is poly(hexamethylene adipamide). Partially aromatic polyamides may be preferred over the aliphatic polyamides where good thermal properties are crucial.

A particular aliphatic polyamide may include, but is not limited to polycapramide (nylon 6), poly-aminoheptanoic acid (nylon 7), poly-aminonanoic acid (nylon 9), polyundecane-amide (nylon 11), polyaurylactam (nylon 12), poly(ethylene-adipamide) (nylon 2,6), poly(tetramethylene-adipamide) (nylon 4,6), poly(hexamethylene-adipamide) (nylon 6,6), poly(hexamethylene-sebacamide) (nylon 6,10), poly(hexamethylene-dodecamide) (nylon 6,12), poly (octamethylene-adipamide) (nylon 8,6), poly (decamethylene-adipamide) (nylon 10,6), poly (dodecamethylene-adipamide) (nylon 12,6) and poly (dodecamethylene-sebacamide) (nylon 12,8).

The most preferred polyamides include poly(m-xylylene adipamide), polycapramide (nylon 6) and poly (hexamethylene-adipamide) (nylon 6,6). Poly(m-xylylene adipamide) is a preferred polyamide due to its availability, high gas barrier properties, and processability.

The matrix polyamides of the present invention may exhibit an I.V. of from about 0.25 to about 1.5 dL/g, or from about 0.4 to about 1.2 dL/g, or from about 0.7 to about 1.0 dL/g. The I.V. is measured at 25° C. in a 60/40 by weight mixture in phenol/tetrachloroethane at a concentration of 0.5 grams per 100 ml. Polyamides having an I.V. within the ranges specified above are of sufficiently high molecular weight to be used in the formation of the articles of the present invention.

As previously disclosed in PCT Publications WO 00/34377 (corresponding to U.S. patent application Ser. No. 09/354,205), and U.S. Pat. Nos. 6,232,388, and 6,034,163, the disclosures of which are hereby incorporated herein by this reference in their entireties, it was shown that the use of low molecular weight polymers (oligomeric resins or polmers) for intercalating and/or melt mixing with the platelet particles and/or layered clay materials of the present invention, may provide good dispersion, creating mostly individual particles. Without being bound by any particular theory, it is believed that the entropy of mixing of the polymers and/or oligomers decreases with decreasing number average molecular weight of the polymer, thereby decreasing the free energy of mixing, which improves dispersion and increases the probability of delaminating the platelet particles into individual platelets.

The I.V. of an oligomeric polyamide used for melt mixing with the layered clay materials to form a concentrate as described hereinbelow may be from about 0.1 and 0.5 dL/g, and more preferably from about 0.3 dL/g to 0.5 dL/g, as measured in a mixture of 60 weight percent phenol and 40 weight percent 1,1,2,2-tetrachloroethane at a concentration of 0.5 g/l 100ml (solvent) at 25° C. The I.V. of the high molecular weight matrix polymer melt-mixed with the concentrate may be at least about 0.7 dL/g and or at least about 1.0 dL/g as measured in a mixture of 60 weight percent phenol and 40 weight percent 1,1,2,2-tetrachloroethane at a concentration of 0.5 g/100 ml (solvent) at 25° C. Moreover, the oligomeric polyamide has a number average molecular weight of from about 200 to about 10,000 g/mol and may be a homo or cooligomer. Oligomeric poly(m-xylylene adipamide) is an oligomeric resin that may be used.

The I.V. of an oligomeric polyester used prior to melt mixing may be from about 0.05 and 0.5 dL/g, or from about 0.1 dL/g to about 0.3 dL/g, as measured in a mixture of 60 weight percent phenol and 40 weight percent 1,1,2,2-tetrachloroethane at a concentration of 0.5 g/100 ml (solvent) at 25° C. The I.V. of the high molecular weight matrix polymer may be at least 0.6 dL/g, or about 0.7 dL/g as measured in a mixture of 60 weight percent phenol and 40 weight percent 1,1,2,2-tetrachloroethane at a concentration of 0.5 g/100 ml (solvent) at 25° C. Moreover, the oligomeric polyester may have a number average molecular weight of from about 200 to about 10,000 g/mol and may be a homo or cooligomer.

Although not necessarily preferred, the oligomers and/or polymers of the present invention may also include suitable additives normally used in polymers. Such additives may be employed in conventional amounts and may be added directly to the reaction forming the oligomer or to the matrix polymer. Illustrative of such additives known in the art include, but are not limited to colorants, pigments, toners, carbon black, glass fibers, fillers, impact modifiers, antioxidants, surface lubricants, denesting agents, UV light absorbing agents, metal deactivators, fillers, nucleating agents, stabilizers, flame retardants, reheat aids, crystallization aids, acetaldehyde reducing compounds, recycling release aids, oxygen scavengers, plasticizers, nucleators, mold release agents, compatibilizers, and the like, or their combinations.

All of these additives and many others and their use are known in the art and do not require extensive discussion herein. Therefore, only a limited number will be referred to, it being understood that any of these compounds can be used in any combination so long as they do not hinder the present invention from accomplishing its objects.

Layered Clay Material (Platelet Particles)

The nanocomposite compositions of the present invention comprise up to about 25 weight percent, or from about 0.5 to about 20 weight percent, or from about 0.5 to about 15 weight percent, or from about 0.5 to about 10 weight percent of platelet particles derived from a layered clay material and/or phyllosilicate clay having exchangeable cations that comprise organic cations, and which typically have a low or decreased level of extractable materials, which include but are not limited to extractable salts of the organic cations.

The layered clay materials which are dispersed in the matrix polymers to form the platelet particles of the invention are often derived from natural, synthetic, and modified phyllosilicates, which contain or have been treated to allow incorporation of organic cations. Natural phyllosilicates include smectite clays, such as montmorillonite, saponite, hectorite, mica, vermiculite, bentonite, nontronite, beidellite, volkonskoite, magadite, kenyaite, and the like. Synthetic phyllosilicates include synthetic mica, synthetic saponite, synthetic hectorite, and the like. Modified phyllosilicates include fluoronated montmorillonite, fluoronated mica, and the like. Suitable phyllosilicates are available from various companies including Nanocor, Inc. of Arlington Heights, Ill., Southern Clay Products, Kunimine Industries, Ltd., and Rheox.

The phyllosilicates and/or layered clay materials are typically swellable free flowing powders having a cation exchange capacity from about 0.3 to about 3.0 milliequivalents per gram of mineral (meq/g), or from about 0.90 to about 1.5 meq/g, or from about 0.95 to about 1.25 meq/g. The phyllosilicate clays used to prepare layered clay materials comprising organic cations typically comprise sheets comprising anionic silicate groups, which may have a wide variety of exchangeable cations present in the galleries between the layers of the phyllosilicate clay, including, but not limited to cations comprising the alkaline metals (group IA), the alkaline earth metals (group IIA), and their mixtures. A particular cation for the starting phyllosilicates is sodium; however, any cation or combination of cations may be used provided that most of the cations may be exchanged for organic cations, as described hereinbelow.

Phyllosilicates may include the 2:1 type having a cation exchange capacity of 0.5 to 2.0 meq/g. Phyllosilicates may include smectite clay minerals, bentonite or montmorillonite, or Wyoming-type sodium montmorillonite or Wyoming-type sodium bentonite having a cation exchange capacity from about 0.95 to about 1.25 meq/g.

Other non-clay materials having the above-described ion-exchange capacity and size, such as chalcogens, may also be used as a source of platelet particles under the present invention. Chalcogens are salts of a heavy metal and group VIA (O, S, Se, and Te). These materials are known in the art and do not need to be described in detail here.

The phyllosilicate clays and/or layered clay materials used in the present invention may be purified by any of the processes described herein or by any other known process that would purify or eliminate impurities from a clay material, such as that disclosed in U.S. Pat. No. 6,050,509, or the procedure used to insure a low quartz content in the clay described in U.S. patent application Ser. No. 09/583,120, filed May 30, 2000. The disclosures of U.S. Pat. No. 6,050,509 and U.S. patent application Ser. No. 09/583,120 are hereby incorporated herein by reference in their entirety, for all purposes, including the disclosures of methods for processing and purifying layered clay materials.

Generally, the phyllosilicate clays and/or layered clay materials useful in this invention are an agglomeration of individual platelet particles that are closely stacked together like cards, in domains called tactoids. The individual platelet particles of the clays preferably have thickness of less than about 2 nm and diameter in the range of from about 10 to about 5000 nm. For the purposes of this invention, measurements refer only to the platelet particle and not any dispersing aids or pretreatment compounds which might be used.

The clays may be dispersed in the polymer(s) so that most of the layered clay material form individual platelet particles, small tactoids, and small aggregates of tactoids. A majority of the tactoids and aggregates in the polymer-clay nanocomposites of the present invention may have thicknesses in the smallest dimension of less than about 20 nm. Polymer-clay nanocomposite compositions with the higher concentration of individual platelet particles and fewer tactoids or aggregates are preferred. The amount of layered clay material and/or platelet particles is determined by measuring the amount of silicate residue in the ash of the polymer/platelet nanocomposite composition when treated in accordance with ASTM D5630-94.

Improvements in gas barrier may result from increases in the concentration of platelet particles in the polymer. While amounts of platelet particles as low as about 0.01 percent provide improved barrier (especially when well dispersed and ordered), compositions having at least about 0.5 weight percent of the platelet particles are preferred because they display the desired improvements in gas barrier.

Prior to incorporation into an oligomer(s) or polymer(s), the particle size of the layered clay material may be reduced in size by methods known in the art, including, but not limited to, grinding, pulverizing, hammer milling, jet milling, and their combinations. It is preferred that the average particle size be reduced to less than 100 micron in diameter, more preferably less than about 50 micron in diameter, and most preferably less than about 20 micron in diameter.

The clay material of this invention may comprise refined or purified but unmodified clays, modified clays, or mixtures of modified and unmodified clays. Generally, it is desirable to treat the selected clay material to facilitate separation of the agglomerates of platelet particles to individual platelet particles and small tactoids. Separating the platelet particles prior to incorporation into the polymer also improves the polymer/platelet interface. Any treatment that achieves the above goals may be used.

Many clay treatments used to modify the clay for the purpose of improving dispersion of clay materials are known and may be used in the practice of this invention. The clay treatments may be conducted prior to, during, or after mixing the clay material with the polymer.

Organic Cations

In an aspect of this invention, a pure, purified, modified or treated layered clay material or mixture of layered clay materials may be prepared by the reaction of a swellable layered clay(s) with an organic cation (to effect partial or complete cation exchange), preferably an ammonium compound. If desired, two or more organic cations may be used to treat the clay. Moreover, mixtures of organic cations may also be used to prepare a treated layered clay material. The process to prepare the organoclays (modified or treated clays) may be conducted in a batch, semi-batch, or continuous manner.

Organic cations used to modify a clay material or a mixture of clay materials of a nanocomposite of this invention are derived from organic cation salts. The term "organic cation" as defined and used herein includes any positively charged ion which comprises at least one carbon atom having at least one bond to hydrogen or another carbon atom. The organic cation may comprise any other heteroatom of the periodic table, and the positive charge need not, and normally does not reside on the carbon atom. The organic cation may comprise at least one organic ligand or residue comprising at least eight carbon atoms. Examples of organic cations include organometallic cations (such as ferrocenium cations and/or their derivatives), as well as "onium" cations having organic substituent groups. The organic cation is normally accompanied by a charge balancing anion, to form a salt of the organic cation. The charge balancing anion, which may be generically symbolized as "X" may be any chemically stable anionic group or residue that does not structurally change or react with the organic cation, including halides, hydroxide, carbonates, alkoxides, carboxylates, phosphates, silicates, or the like.

Organic cations may be "Onium" cations having a positively charged nitrogen, phosphorus, sulfur, or oxygen atom, in addition to the at least one carbon atom. Ammonium and phosphonium organic cations that may be useful for the nanocomposite and process of this invention may generally be represented by the following formula (I):

(I)

wherein M is either nitrogen or phosphorous; and $R_1$, $R_2$, $R_3$, and $R_4$ are independently organic and/or oligomeric ligands or may be hydrogen, and at least one of $R_1$, $R_2$, $R_3$, and $R_4$ comprises at least one organic or oligomeric group comprising at one carbon atom. Ammonium and phosphonium cations are normally accompanied by a charge balancing X-anion, to form an ammonium or phosphonium salt. Preferred $X^-$ anions may include a halide, hydroxide, or acetate anion, preferably chloride or bromide;

Examples of useful organic ligands include, but are not limited to linear or branched alkyl groups having from 1 to 22 carbon atoms, aralkyl groups which are benzyl and substituted benzyl moieties including fused-ring moieties having linear chains or branches of from 1 to 100 carbon atoms in the alkyl portion of the structure, aryl groups such as phenyl and substituted phenyl including fused-ring aromatic substituents, beta, gamma unsaturated groups having six or less carbon atoms, and alkyleneoxide groups having from 2 to 6 carbon atoms, or alkylene oxide groups having repeating units comprising from 2 to 6 carbon atoms. Examples of useful oligomeric ligands include, but are not limited to poly(alkylene oxide), polystyrene, polyacrylate, polycaprolactone, and the like.

$R_1$ and $R_2$ may be organic ligands. At least one of $R_1$ or $R_2$ may comprise a long chain alkyl or alkene group having at least 8 carbon atoms, or more preferably between about 12 and 24 carbon atoms. Alkene groups comprise a mono-unsaturated or multiply-unsaturated hydrocarbon group of from 2 to 24 carbon atoms, or more preferably, from 12 to 22 carbon atoms. At least one of $R_1$ and $R_2$ may be a lower alkyl group, such as a methyl group.

Examples of useful organic cations may include, but are not limited to alkyl ammonium ions, such as tetramethyl ammonium, hexyl ammonium, butyl ammonium, bis(2-hydroxyethyl) dimethyl ammonium, hexyl benzyl dimethyl ammonium, benzyl trimethyl ammonium, butyl benzyl dimethyl ammonium, tetrabutyl ammonium, di(2-hydroxyethyl) ammonium, and the like, and alkyl phosphonium ions such as tetrabutyl phosphonium, trioctyl octadecyl phosphonium, tetraoctyl phosphonium, octadecyl triphenyl phosphonium, and the like or mixtures thereof.

Other particularly useful organic cations for this invention include, but are not limited to alkyl ammonium ions such as dodecyl ammonium, octadecyl trimethyl ammonium, bis(2-hydroxyethyl) octadecyl methyl ammonium, bis(2-hydroxyethyl) methyl tallow ammonium, bis(2-hydroxyethyl) methyl hydrogenated tallow ammonium, octadecyl benzyl dimethyl ammonium, and the like or mixtures thereof.

Useful alkoxylated ammonium compounds may include mono-alkoxylated, di-alkoxylated, tri-alkoxylated, and tetra-alkoxylated ammonium compounds, wherein the alkoxylate group comprises at least one alkyleneoxide group having from 2 to 6 carbon atoms. Alkoxylate groups may be hydroxyalkygroups, having at least one terminal hydroxyl (—OH) group bound to any one of the carbon atoms.

Examples of useful alkoxylate ligands include, but are not limited to hydroxyethyl, hydroxypropyl, hydroxybutyl, poly(ethylene oxide), poly(propylene oxide), poly(butylene oxide), and the like.

Useful mono-alkoxylated ammonium salts can be represented as follows:

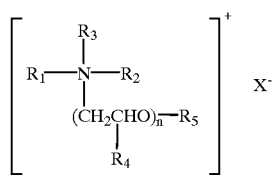

wherein N represents nitrogen; $X^-$ represents an anion which may be a halide atom such as chloride or bromide; $R_1$, $R_2$, and $R_3$ may be the same or different and may be selected from organic and oligomeric ligands comprising from 1 to 30 carbon atoms or may be hydrogen; n is at least 1; $R_4$ is selected from hydrocarbons comprising from 1 to 4 carbon atoms, hydrogen, and their mixtures; and $R_5$ is selected from hydrocarbons comprising from 1 to 7 carbon atoms and hydrogen. Illustrative of suitable mono-alkoxylated amine compounds, which are converted to the ammonium salt by reaction with a Bronsted acid, include, but are not limited to those under the trade name of JEFFAMINE.

Useful di-alkoxylated ammonium salts can be represented as follows:

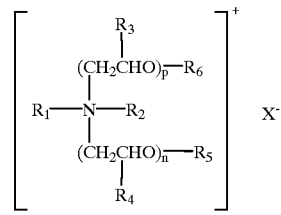

wherein N represents nitrogen; $X^-$ represents an anion which may include a halide atom such as chloride or bromide; $R_1$ and $R_2$ may be the same or different and are selected from organic and oligomeric ligands comprising from 1 to 30 carbon atoms or may be hydrogen; p and n are at least 1; and $R_3$, $R_4$, $R_5$ and $R_6$ may be same or different and are selected from hydrocarbons comprising 1 to 4 carbon atoms and hydrogen. $R_1$ and $R_2$ may be organic ligands. At least one of $R_1$ or $R_2$ may comprise a long chain alkyl or alkene group having at least 8 carbon atoms, or from about 12 to 24 carbon atoms. At least one of $R_1$ and $R_2$ may be a lower alkyl group, such as a methyl group. $R_3$, $R_4$, $R_5$ and $R_6$ may be hydrogen Examples of useful di-alkoxylated ammonium compounds include, but are not limited to bis(2-hydroxymethyl), octadecyl ammonium, bis(2-hydroxyethyl), octadecylmethyl ammonium, octadecylisopropoxydimethyl ammonium, and the like or mixtures thereof.

Useful tri-alkoxylated ammonium salts can be represented as follows:

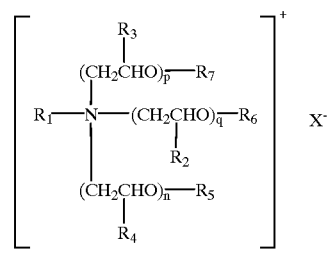

wherein N represents nitrogen; $X^-$ represents an anion which is preferably a halide atom such as chloride or bromide; $R_1$ is selected from organic and oligomeric ligands comprising from 1 to 30 carbon atoms or may be hydrogen; n, p, and q are at least 1; and $R_2$, $R_3$, $R_4$, $R_5$, $R_6$ and $R_7$ may be same or different and are selected from hydrocarbons comprising from 1 to 4 carbon atoms and hydrogen.

Useful tetra-alkoxylated ammonium salts can be represented as follows:

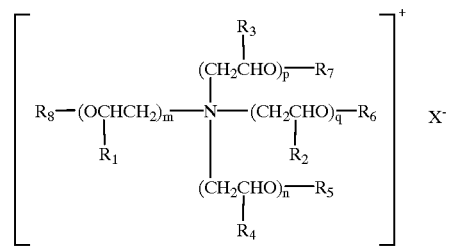

wherein N represents nitrogen; $X^-$ represents an anion which may be a halide atom such as chloride or bromide; m, n, p and q are at least 1; and $R_1$, $R_2$, $R_3$, $R_4$, $R_5$, $R_6$, $R_7$ and $R_8$ may be same or different and are selected from hydrocarbons comprising 1 to 4 carbon atoms and hydrogen.

The preferred alkoxylated ammonium salts are di-ethoxylated ammonium salts represented as follows:

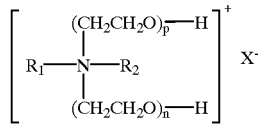

wherein N represents nitrogen; $X^-$ represents an anion which is preferably a halide atom such as chloride or bromide; $R_1$ is selected from organic and oligomeric ligands comprising at least 8 carbon atoms; $R_2$ is selected from alkyl ligands comprising from 1 to 4 carbon atoms, or may be hydrogen; and p and n are at least 1. p and n may be 1.

Illustrative examples of suitable polyalkoxylated ammonium compounds include the hydrochloride salts of polyalkoxylated amines such as JEFFAMINE (of Huntsman Chemical), namely, JEFFAMINE-506 and JEFFAMINE 505, and an amine available under the trade name ETHOMEEN (of Akzo Chemie America), namely, ETHOMEEN 18/25, which is octadecyl bis(polyoxyethylene[15])amine, wherein the numbers in brackets refer to the total number of ethylene oxide units. A further illustrative example of a suitable polyalkoxylated ammonium compound is ETHOQUAD 18/25 (of Akzo Chemie America), which is octadecyl methyl bis(polyoxyethylene[15]) ammonium chloride, wherein the numbers in brackets refer to the total number of ethylene oxide units.

Modification of the Clays with Organic Cations By Cation Exchange Processes

Numerous methods to modify layered clays with the above organic cations are known, and any of these may be used in the practice of this invention. Various aspects of this invention relate to the organic modification of a layered clay with an organic cation salt via cation exchange processes.

The cation exchange processes may be carried out by treating a individual phyllosilicate clay or a mixture of clays with one or more salts comprising an organic cation or a mixture of organic cations, as schematically indicated by the equation below:

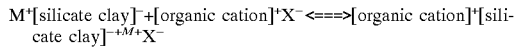

wherein $M^+$ is one of the many exchangeable alkali metal or alkaline earth metal cations associated with silicate anions in the galleries of a phyllosilicate clay, and $X^-$ is the anion of the salt of the organic cation supplied to intercalate and/or cation exchange the phyllosilicate clay.

It is to be understood that the term "exchangeable" cation, as defined and used in the specification and claims herein refers to a cation associated with the silicate anions of a layered clay material (regardless of whether the exchangeable is metallic or organic) which will react with an externally supplied salt comprising a second cation and associated anion, so that the exchangable cation(s) of the clay are at least partially replaced by the second cation.

In some embodiments, $M^+$ is sodium, and $X^-$ is a halide, such as chloride, so that the reaction becomes:

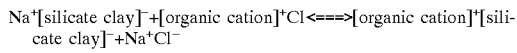

The products of such ion exchange reactions may be intercalated layered clay materials, which may be alternatively termed "organoclays," comprise a residue of the original phyllosilicate clay, in which the exchangeable metallic cations have been substantially or completely removed and replaced with organic cations.

In the practice of the present invention, it may be desirable that the cation exchange process be carried out in a manner that provides an intercalated layered clay that is highly and/or substantially cation exchanged with the organic cations. The organic cations may comprise at least about 80% of the cation exchange capacity of the layered clay material. The organic cations may also comprise at least about 85%, at least about 90%, at least about 95%, or at least about 100% of the cation exchange capacity of the layered clay material. It is to be understood that the cation exchange capacity of the clay is an experimentally determined number, which may have some experimental uncertainty associated therewith, so that the measured percentage of exchange of organic cations can sometimes exceed 100% of the measured cation exchange capacity of the layered clay material, because of the experimental errors of measurement. Therefore, in some cases, the organic cations may comprise at least about 105%, or at least about 110%, of the experimentally measured cation exchange capacity of the layered clay material.

Furthermore, the exchangeable cations of the layered clay material may be substantially cation exchanged with organic cations, so as to remove any small quantities of alkali metal or alkaline earth metal cations originally present in the phyllosilicate clay which can impede dispersion of the intercalated layered clay material. Almost complete or complete cation exchange is desirable because organic cations are believed to facilitate, and metallic cations are believed to electrostatically inhibit the expansion of the layers of the layered clay material and it's dispersion to provide platelet particles. It is therefore desirable that the exchangeable cations of the layered clay material consist essentially of organic cations. It is to be understood however, that small amounts or trace amounts of metallic cations may not be cation exchanged, depending on the structure and physical properties of the organic cation, the layered clay, and the metallic cations, and the cation exchange process employed. Therefore, small or trace amounts of metallic cations may be present. The presence of such small or trace amounts of metallic cations are considered to lie within the scope of this invention and the aspects of the invention in which the layered clay material is substantially free from metallic cations, salts of metallic cations, or salts of organic cations.

The layered clay material may comprise no more than about 1 weight % of alkaline metal or alkaline earth metal cations. Alternatively, the layered clay material may comprise no more than about 0.8 weight %, no more than about 0.6 weight %, no more than about 0.4 weight %, or no more than about 0.2 weight % of alkaline metal or alkaline earth metal cations. Similarly, the layered clay material may comprise no more than about 0.8 weight %, no more than about 0.6 weight %, no more than about 0.4 weight %, or no more than about 0.2 weight % of sodium cations.

In some aspects of the current invention, the cation exchange process may be carried out by dispersing a layered clay or mixture of clays into hot water, in particular from about 50 to about 80° C., then adding (neat or dissolved in water a lower alcohol, or other similar polar organic solvents) the organic cation salt or an organic amine and a Bronstead acid (thereby forming the organic ammonium salt in situ), then agitating and/or blending for a period of time sufficient for the organic cations to exchange most of the metal cations present in the galleries between the layers of the clay material(s). In prior art ion-exchange procedures it is often taught to employ at least some excess quantities of the salt of the organic cation as compared to the ion exchange capacity of the layered clay material, in order to factilitate complete exchange of the cations. Then, the purified and organically-modified layered clay material(s) is isolated by methods known in the art including, but not limited to, filtration, centrifugation, spray drying, and/or their combinations. Use of excess salts of the organic cation often produces intercalated layered clay materials that are contaminated with excess salts of the organic cation, and/or product salts of the cation exchange process, such as sodium chloride.

Furthermore, in the present invention, it has been discovered that the cation-exchange process may be improved by providing the longer reaction times to allow complete exchange of the cations, to remove sodium chorlide and other impurities present. Moreover, the gentle, low temperature drying conditions, and reduced particle size lead to a further improved organoclay.

However, the inventors have found that the reduction of the concentrations of such extractible salts of organic cations to low levels, or their effective elimination, so that the layered clay may become substantially free of such extractable salts of organic cations, can unexpectedly improve the properties of nanocomposites prepared from layered clay materials having reduced levels of such extractible organic cations. The degree to which the concentrations of such undesirable extractable salts of organic cations must be reduced in order to obtain significant improvement in the physical properties of the final nanocomposites will of course vary with the nature of the matrix polymer and processing conditions such as time and temperature, the identity and chemical stability of the organic cations and organic cations salts, and other variables. Nevertheless, the concentration levels to which such salts of organic cations must be reduced to obtain the benefits of the invention can be readily determined by those of skill in the art with only routine experimentation, by comparing the physical properties of the nanocomposites (such as haze, gas barrier properties, void concentration, and the like) to otherwise similar nanocomposites comprising layered clay materials that are prepared with small excesses of extractable salts of organic cations. For example, a layered clay material prepared using organic cation salts at the level of about 110% of the cation exchange capacity of the layered clay material would normally include undesirably high levels of extractable organic salts, and could be used to make nanocomposites for comparative experimentation.

The excess starting organic salts or product salt compounds may sometimes be at least partially removed from the layered clay by washing and/or extraction of the layered clay material with water and/or polar solvents, which include alcohols. Therefore the excess salts may be considered an "extractable" salt. It is therefore possible to remove some of the metal cation salt(s) and some of the excess organic cation salt(s) by washing and other techniques known in the art. However, addition of a washing step to remove any extractable salts from the intercalated layered clay material adds expense and complexity to the processes of the invention, and is often only partially effective to remove any undesired extractable salts.

Therefore, in some aspects, the invention relates to alternative processes for producing intercalated layered clay materials that are substantially free of undesired extractable salts. In particular, the invention provides processes for treating a layered clay material with one or more salts of an organic cation, wherein the total quantity of the salts of the organic cation used to treat the layered clay material is selected to i) substantially cation exchange the layered clay material with one or more organic cations, and ii) provide an intercalated layered clay material substantially free of extractable salts of the organic cations.

It is possible to select a quantity of the salts of the organic cation used to treat the layered clay material to accomplish the above-described criteria by various procedures, of which the following procedure is an example.

First, because the cation exchange capacity of different phyllosilicates and sources of phyllosilicates may vary significantly, the ion exchange capacity of the phyllosilicate to be cation exchanged is experimentally measured. This can be done by various methods known to those of skill in the art, including titration with methylene blue in aqueous solution. In a methylene blue titration of layered clay materials, after excess methylene blue is added so as to exceed the point of full cation exchange and/or saturation of methylene blue into the galleries of the clay, the excess methylene blue will remain in the aqueous solution. The presence of the excess methylene blue can be readily observed either by visual or UV/visible photometric means. From the amount of methylene blue employed in the titration, an experimentally determined approximation of the cation exchange capacity of the particular sample of the layered clay material can be calculated.

Second, given an experimental estimate of the cation exchange capacity of the clay by titration, several cation exchange experiments are run for the particular layered clay to be employed, using small incremental variations in the amount of the salt of the organic cation to be used to cation exchange the clay. After the cation exchange experiments are run, the isolated clays are analyzed for extractable salts by various methods.

The halide content of the layered clay experimental samples can be measured by.

The amount of extractable salts of organic cations can be measured by extracting a sample of the layered clay material (about 0.5 grams, for example) in refluxing ethanol (about 150 milliliters for a 0.5 gram sample of layered material) for at least about 0.5 hours, so as to remove the extractable organic salts. Then a sample of the clay that has been extracted with ethanol, and a sample that has not been subjected to ethanol extraction are subjected to thermogravimetric analysis (TGA) in air at a heating rate of 20° C./min, up to a temperature of 800° C. During the TGA analysis, any organic cations or other organic materials decompose and/or volatilize in the clay samples, and the TGA experiment provides a weight of the remaining ash residue. The difference in weights can be used to calculate the % of extractable organic salts as follows:

$$\% \text{ extractables} = \frac{\% \ org_{(initial)} - \% \ org_{(extracted)}}{\% \ res_{(initial)}} \times 100\%$$

The experiment from the series of experiments which produces the lowest percentage of extractible salts of organic cations and/or halides is employed to select the quantity of salts of organic cations to be used to treat the starting phyllosilicate, per unit mass.

It is to be understood that the salt of the organic cation used to exchange the starting clays and/or phyllosilicates, and the product salts (such as NaCl), are often at least somewhat soluble in polar solvents such as water, alcohols, and the like. By comparison, the clay and its silicate anions are normally insoluble, and the cations associated with the silicate anions cannot be removed from the clay by solvent extraction or washing, because the overall electrical charge balance of the clay must be maintained. The cations associated with the layered clay material are therefore not "extractible" by solvent extraction or washing, and are normally only removable from the clay only by additional ion exchange reactions.

The extractable salts of organic cations contained in the layered clay material may comprise no more than 5 weight % of the layered clay material after cation exchange. Alternatively, the extractable salts of organic cations contained in the layered clay material may comprise no more than about 4 weight %, no more than about 3 weight %, no more than about 2 weight %, or no more than about 1 weight %, of the layered clay material after cation exchange The cation exchanged layered clay material may comprise no more than a total of about 1 weight % of halide anions. Alternatively, the cation exchanged layered clay material may comprise no more than a total of about 0.8 weight %, no more than a total of about 0.6 weight %, no more than a total of about 0.4 weight %, or no more than about 0.2 weight % of halide anions. Similarly, the cation exchanged layered clay material may comprise no more than a total of about 0.8 weight %, no more than a total of about 0.6 weight %, no more than a total of about 0.4 weight %, or no more than about 0.2 weight % of chloride or bromide anions.

After cation exchange, the particle size of the cation exchanged organoclay material may be reduced in size by methods known in the art, including, but not limited to, grinding, pulverizing, hammer milling, jet milling, and/or their combinations. It is preferred that the average particle size be reduced to less than 100 micron in diameter, more preferably less than 50 micron in diameter, and most preferably less than 20 micron in diameter. It is important to remove large size particles, as they cause increased haze and voids.

Other Clay Treatments

The layered clay material may be further treated for the purposes of aiding exfoliation in the nanocomposite, increasing the molecular weight and/or improving the strength of the polymer/clay interface. Any treatment that achieves the above goals may be used. Increasing the molecular weight of the polyamide-platelet particle composite may be achieved by several different methods including, but not limited to, reactive chain extension, solid state polymerization, crosslinking, and melt compounding with a high molecular weight matrix polymer.

Examples of useful treatments include, but are not limited to intercalation with water-soluble or water-insoluble polymers, organic reagents or monomers, silane compounds, metals or organometallics, expanding agents, oligomeric polymers or resins, dispersing aids and/or their combinations. Treatment of the clay can be accomplished prior to the addition of a polymer to the clay material, during the dispersion of the clay with the polymer or during a subsequent melt blending or melt fabrication step.

Examples of useful methods for pretreatment of the cation exchanged organoclay materials with polymers and oligomers include those disclosed in U.S. Pat. Nos. 5,552,469 and 5,578,672, and PCT Patent Application WO 00/34377, published Jun. 15, 2000 and U.S. patent application Ser. No. 09/583,120, filed May 30, 2000, the disclosure of which are incorporated herein in their entireties by reference, and particularly for the purpose of their descriptions of pretreatments of layered clay materials. Examples of useful polymers for treating the clay material include polyvinyl pyrrolidone, polyvinyl alcohol, polyethylene glycol, polytetrahydrofuran, polystyrene, polycaprolactone, certain water-dispersible polyesters, Nylon-6, oligomeric poly(m-xylylene adipamide), and the like.

Examples of useful pretreatment with organic reagents and monomers include those disclosed in EP 780,340 A1, incorporated herein by reference. Examples of useful organic reagents and monomers for intercalating the swellable layered clay include dodecylpyrrolidone, caprolactone, caprolactam, ethylene carbonate, ethylene glycol, bishydroxyethyl terephthalate, dimethyl terephthalate, and the like or mixtures thereof.

Examples of useful pretreatment with silane compounds include those treatments disclosed in WO 93/11190, incorporated herein by reference. Examples of useful silane compounds includes (3-glycidoxypropyl)trimethoxysilane, 2-methoxy (polyethyleneoxy)propyl heptamethyl trisiloxane, octadecyl dimethyl (3-trimethoxysilylpropyl) ammonium chloride and the like.

Examples of suitable water dispersible compounds include sulfonated polymers such as sulfonated polyesters and sulfonated polystyrene.

If desired, a dispersing aid may be present during or prior to the formation of the composite for the purposes of aiding exfoliation of the treated or untreated swellable layered particles into the polymer. Many such dispersing aids are known and cover a wide range of materials including water, alcohols, ketones, aldehydes, chlorinated solvents, hydrocarbon solvents, aromatic solvents, and the like or combinations thereof.

It should be appreciated that on a total composition basis, dispersing aids and/or pretreatment compounds may account for significant amount of the total composition, in some cases up to about 30 weight percent. While it is preferred to use as little dispersing aid/pretreatment compound as possible, the amounts of dispersing aids and/or pretreatment compounds may be as much as about 9 times the amount of the platelet particles.

In one aspect, this invention relates to a polyamide-clay nanocomposite material comprising a polyamide having dispersed therein platelet particles derived from various clay materials that are pure and/or are purified, and may be untreated or metal intercalated, organically modified through cation exchange, or intercalated with other oligomeric or high molecular weight pretreatment compounds.

Nanocomposite Processes

The polymer-clay nanocomposites of this invention may be prepared from the matrix polymer and layered clay material in different ways. Many processes to prepare polymer-clay nanocomposite compositions are known, and any of these processes may be used to prepare the composites of this present invention.

In some aspects, the invention relates to a process for preparing a polymer-clay nanocomposite comprising the steps of:
  a) treating a layered clay material with one or more salts of an organic cation, wherein the total quantity of the salts of the organic cation used to treat the layered clay material is selected to
     i) substantially cation exchange the layered clay material with one or more organic cations, and
     ii) provide an intercalated layered clay material substantially free of extractable salts of the organic cations, and
  b) melt mixing the intercalated layered clay material with a matrix polymer to form a polymer-clay nanocomposite.

For polyamides, formation of a polyamide-clay nanocomposite includes, but is not limited to, reactive chain extension of an oligomeric polyamide-platelet particle composite, and melt compounding of an oligomeric polyamide composite with a high molecular weight, melt processible polyamide. The monomer unit of the melt processible polyamide may be the same as or different than the oligomeric polyamide.

Processes for forming polyester-clay nanocomposites include, but are not limited to solid state polymerization, melt compounding with melt processible polyester, and/or their combinations. In one aspect of this invention, the I.V. of an oligomeric polyester-clay composite is increased by solid state polymerization. In another aspect of this invention, an oligomeric polyester-clay composite is compounded with a melt processible polyester and used as is, or is increased in I.V. by solid state polymerization. The monomer unit of the melt processible polyester may be the same as or different than the oligomeric polyester.

In one aspect of this invention, the melt mixing step is achieved by dry mixing polymer with a layered clay having a decreased level of extractable material and passing the mixture through a compounding extruder under conditions sufficient to melt the polymer.

In another aspect of this invention, the melt-mixing step is conducted by feeding the polymer and treated or untreated layered particles separately into a compounding extruder. When treated layered particles are used in this process, it is usually preferred that the polymer be added first to minimize degradation of treated layered particles.

Melt processing or mixing may include melt and extrusion compounding. Use of extrusion compounding to mix the clay and the polymer may present two advantages. Chiefly, the extruder is able to handle the high viscosity exhibited by the nanocomposite material. In addition, in a melt mixing approach for producing nanocomposite materials, the use of solvents can be avoided. Low molecular weight liquids can often be costly to remove from the nanocomposite resin. Moreover, use of extrusion compounding to mix the clay and the polymer is preferred because of the ease of preparation and the potential to attain high clay loadings.

Although any melt mixing device may be used, typically, melt mixing is conducted either by a batch mixing process or by a melt compounding extrusion process during which treated or untreated layered clay particles are introduced into an oligomeric or polymeric resin. Prior to melt mixing, the treated or untreated layered particles may exist in various forms including pellets, flakes, chips and powder. The treated or untreated layered particles may be reduced in size by methods known in the art, such as hammer milling and jet milling. Prior to melt mixing, an oligomeric or polymeric resin may exist in wide variety of forms including pellets, ground chips, powder or its molten state.

This invention also relates to a process comprising the steps of (1) preparing an oligomeric resin-platelet particle composite by melt mixing a clay material comprising platelet particles and an oligomeric resin and (2) preparing a high molecular weight polymer-clay nanocomposite material.

In a related aspect, the invention provides process for preparing a polymer-clay nanocomposite comprising the steps of:
  a) forming a concentrate comprising an oligomeric resin and an intercalated layered clay material having exchangeable cations, wherein
    i) the cations of the layered clay material consist essentially of one or more organic cations, and
    ii) the layered clay material is substantially free of extractable salts of the organic cations, and
  b) melt mixing the concentrate with a matrix polymer to form a polymer-clay nanocomposite.

In one aspect, the steps comprise: (i) melt mixing platelet particles with a matrix polymer-compatible oligomeric resin to form an oligomeric resin-clay composite, and (ii) mixing the oligomeric resin-clay composite with a high molecular weight matrix polymer thereby increasing the molecular weight of the oligomeric resin-platelet particle composite and producing a polymer nanocomposite material.

In another aspect, the melt-mixing step is conducted by feeding the oligomeric resin and treated or untreated layered particles separately into a compounding extruder. When treated layered particles are used in this process, it is preferred that the oligomeric resin be added first to minimize degradation of treated layered particles.

In another aspect of this invention, a high concentration of layered particles may be melt mixed with oligomeric resin by mixing in a reactor. The resulting composite material is then either chain extended, polymerized to high molecular weight, or let down in the extruder into a high molecular weight polymer to obtain the final nanocomposite material.

The oligomeric resin and the high molecular weight polymer may have the same or different repeat unit structure, i.e., may be comprised of the same or different monomer units. Preferably, the oligomeric resin has the same monomer unit to enhance compatibility or miscibility with the high molecular weight polymer.

In another aspect of this invention, molten oligomeric resin may be fed directly to a compounding extruder along with treated or untreated layered particles to produce the oligomeric resin-platelet particle nanocomposite.

If desired, a dispersing aid may be present during or prior to the formation of the composite by melt mixing for the purposes of aiding exfoliation of the treated or untreated swellable layered particles into the polymer. Many such dispersing aids are known covering a wide range of materials including water, alcohols, ketones, aldehydes, chlorinated solvents, hydrocarbon solvents, aromatic solvents, and the like or combinations thereof.

The molecular weight of the polymer material may be increased by any of a number of known approaches or by any combination of these approaches, e.g., chain extension, reactive extrusion, extrusion let-down, solid state polymerization or annealing, annealing under a flow of inert gas, vacuum annealing, let-down in a melt reactor, etc.

The polymer-clay nanocomposite of the present invention having therein the purified or clean low surfactant clay has improved barrier to gas when formed into a wall or article compared either to a neat polymer or to a comparable nanocomposite containing a clay with a high extractable level, when formed into the same or similar structure. In addition, these nanocomposites have been found to show unexpected resistance to void formation and other defect formation in the presence of dispersed and/or exfoliated pure and/or purified clays when undergoing orientation and/or other film or article processing steps.

Articles

The polymer-clay nanocomposite of this invention may be formed into articles by conventional plastic processing techniques. Molded articles may be made from the above-described polymers by compression molding, blow molding, extrusion or other such molding techniques, all of which are known in the art. Monolayer and/or multilayer articles prepared from the nanocomposite material of this invention include, but are not limited to film, sheet, pipes, tubes, profiles, molded articles, preforms, stretch blow molded films and containers, injection blow molded containers, extrusion blow molded films and containers, thermoformed articles and the like. The containers may be bottles.

Oriented articles produced from the present polymer-clay compositions are also expected to have low haze and reduced voids. Composite compositions produced according to the present invention are especially useful for preparing clear bottles and film (low haze) that may also exhibit improved gas barrier properties. Additionally, products produced from these composites can achieve lower haze and higher gas barrier properties than products produced from conventional polymer-clay composites.

In forming stretch blow molded bottles of one or several layers, it is often customary to initially form a preform of the desired vessel via an injection molding process. The crystallization rate of the materials comprising the preform must be sufficiently slow to allow the formation of an essentially noncrystalline article. Unless the preform is essentially noncrystalline, it is exceedingly difficult to stretch blow mold into the desired shape to form a bottle. In one aspect of this invention, the layered silicate materials and treatment compounds are selected both to promote dispersion of the individual platelets into the polymer, e.g., polyamide to allow maximum barrier enhancement, minimum haze formation, and the formation of preforms by injection molding which are essentially noncrystalline in character.

The bottles and containers of this invention may provide increased shelf storage life for contents, including beverages and food that are sensitive to the permeation of gases. Articles, more preferably containers, of the present invention often display a gas transmission or permeability rate (oxygen, carbon dioxide, water vapor) of at least 10% lower (depending on clay concentration) than that of similar containers made from clay-free polymer, resulting in correspondingly longer product shelf life provided by the container. Desirable values for the sidewall modulus and tensile strength may also be maintained. The articles also show unexpected resistance to haze formation, crystallization, void and other defect formation.

The articles may also be multilayered. Preferably, the multilayered articles have a nanocomposite material disposed intermediate to other layers, although the nanocomposite may also be one layer of a two-layered article. In embodiments where the nanocomposite and its components are approved for food contact, the nanocomposite may form the food contact layer of the desired articles. In other embodiments, it is preferred that the nanocomposite be in a layer other than the food contact layer.

The multilayer articles may also contain one or more layers of the nanocomposite composition of this invention and one or more layers of a structural polymer. A wide variety of structural polymers may be used. Illustrative of structural polymers are polyesters, polyetheresters, polyamides, polyesteramides, polyurethanes, polyimides, polyetherimides, polyureas, polyamideimides, polyphenyleneoxides, phenoxy resins, epoxy resins, polyolefins, polyacrylates, polystyrene, polyethylene-co-vinyl alcohols (EVOH), and the like or their combinations and blends. The preferred structural polymers are polyesters, such as poly(ethylene terephthalate) and its copolymers.

In another aspect, co-extruding a layer of the polymer-clay nanocomposite specified above with some other suitable thermoplastic resin may form articles. The polymer-clay nanocomposite and the molded article and/or extruded sheet may also be formed at the same time by co-injection molding or co-extruding.

Another aspect of this invention is the combined use of silicate layers uniformly dispersed in the matrix of a high barrier thermoplastic together with the multilayer approach to packaging materials. By using a layered clay to decrease the gas permeability in the high barrier layer, the amount of this material that is needed to generate a specific barrier level in the end application is greatly reduced.

Since the high barrier material is often the most expensive component in multilayer packaging, a reduction in the amount of this material used can be quite beneficial. With the polymer-clay nanocomposite layer being sandwiched between two outer polymer layers, the surface roughness is often considerably less than for a monolayer nanocomposite material. Thus, with a multilayer approach, the level of haze may be further reduced.

As exemplified above, the layered clay having a low level of extractables and the matrix polymer components of the nanocomposite of this invention may be combined in a wide variety of ways that are known to those skilled in the art. Therefore, it will be apparent to those skilled in the art that various modifications and variations can be made to the processes embodied above without departing from the scope of the invention. Other aspects of the invention will be apparent to those skilled in the art from consideration of the specification and practice of the invention disclosed herein. It is intended that the description of the above embodiments not be limiting.

EXAMPLES

The following examples and experimental results are included to provide those of ordinary skill in the art with a complete disclosure and description of particular manners in which the present invention can be practiced and evaluated, and are intended to be purely exemplary of the invention and are not intended to limit the scope of what the inventors regard as their invention. Efforts have been made to ensure accuracy with respect to numbers (e.g., amounts, temperature, etc.); however, some errors and deviations may have occurred. Unless indicated otherwise, parts are parts by weight, temperature is in ° C. or is at ambient temperature, and pressure is at or near atmospheric.

Example 1

Example 1 illustrates one embodiment of a nanocomposite and an intercalate of the present invention.

MXD6 6007, poly(m-xylylene adipamide) with an I.V. of about 1.1 dL/g, was purchased from Mitsubishi Chemical Co. An organo-montmorillonite clay (PGC-Q182) was provided by Nanocor Inc. of Arlington Heights, Ill. The organo-montmorillonite clay has a quartz content of 0.33 wt% determined from X-ray diffraction method. Also, this organoclay has a $Na^+$ content of 0.12 wt %, as determined by X-ray diffraction.

The PGC-Q 182 organo-montmorillonite clay may be prepared by onium ion exchanging (by way of example) 1000 grams of Na-montmorillonite with 701 grams bis(2-hydroxyethyl) octadecyl methyl ammonium chloride. The finished product is dried and milled. The tether on the clay is bis(2-hydroxyethyl) octadecyl methyl ammonium. FIG. 1 shows the chloride content of a particular sample of the treated clay, as analyzed by X-Ray fluorescence, after the clay was extracted by the procedure described hereinabove with (1) water, or (2) ethanol. As can be seen from Table 1, the chloride level of the sample of treated clay before water extraction was 0.41 weight percent, and 0.24 weight percent after water extraction. When subjected to ethanol extraction, the analyzed chloride content of the clay was only 0.05 weight %. While not wishing to be bound by any theory, it is believed that this example represents a clay having relatively low chloride and/or extractable organic cation content, which can nevertheless be significantly improved by ethanol extraction and/or washing.

D(ND), a low molecular weight m-xylyladipamide polyamide was purchased from Polymer Chemistry Innovations. This material was analyzed by titration of the amine and carboxylate end groups to possess a number average molecular weight of about 3,000, and was determined to have an I.V. of about 0.41 dL/g. 1421.8 grams of this oligomeric poly(m-xylyladipoyl diamine) was dry mixed with 378.2 grams of the organo-montmorillonite clay from Nanocor, Inc. Prior to dry mixing, the individual components were dried at 80° C. under vacuum for 24 hours. The mixture was then extruded on the Leistritz Micro 18 co-rotating twin screw extruder equipped with a general compounding screw. The AccuRate pellet feeder was set at a rate of approximately 2 kg/hr with a nitrogen atmosphere over both the feeder and the hopper. The barrel and die temperatures were set at 240° C. and the screw RPM at approximately 200.

After the extrusion was complete, 1666.7 grams of the extrudate pellets are dry-mixed with 8333.3 grams of MXD6 6007 polyamide. The mixture was then extruded on the Leistritz 18 mm twin screw extruder at a processing temperature of 260–270° C. and a screw RPM of 300 at a feed rate of about 3 lb/hr.

The resulting nanocomposite material, designated as MXD6/D(ND)/PGC-Q 182, was used as the middle layer of co-injected trilayer preforms. The ash content of the resulting nanocomposite was 2.53%. The inner and outer layers of the trilayer preform were made from Eastman's amber colored PET 20261, having about 0.80 dL/g I.V. The nominal thickness of the middle layer was about 8% of the total thickness. The preforms were stretch blow molded into 16 oz. beer bottle. The bottle sidewall was cut and the middle layer containing the nanocomposite material was peeled from the three-layer configuration, and analyzed for haze, oxygen permeability and optical microscopy. The results of the nanocomposite property measurements for this Example are given in Table 1 attached hereinbelow.

Examples 2–4

Example 2 illustrates another embodiment of the present invention. A control sample was also prepared, having only MXD6 in the middle layer.

MXD6 6007, poly(m-xylylene adipamide) with an I.V. of about 1.1 dL/g, was purchased from Mitsubishi Chemical Co. The organo-montmorillonite clays (Nanomer types) were provided by Nanocor Inc. of Arlington Heights, Ill.

The nanomer samples were prepared by the process described in their U.S. Pat. No. 6,050,509, and the organo-montmorillonite clay was supplied by Nanocor, Inc., Arlington Heights, Ill. The organo-montmorillonite clay of Example 2 can be prepared by treating 1000 grams of Na-montmorillonite with 701 grams of bis(2-hydroxyehtyl) octadecyl methyl ammonium chloride. The organo-montmorillonite clay of Example 3 can be prepared by treating 1000 grams of Na-montmorillonite with 950 grams of bis(2-hydroxyethyl) octadecyl methyl ammonium chloride. The organo-montmorillonite clay of Example 4 can be prepared by treating 1000 grams of Na-montmorillonite with 1000 grams of bis(2-hydroxyethyl) octadecyl methyl ammonium chloride. The modified montmorillonite clay were dried and milled. The chloride contents of samples of the treated clays, both before and after extraction with (1) water or (2) ethanol, can be seen in Table 1. As can be seen in Table 1, the treated clay employed in Example 2 has a very low chloride content, and/or a very low content of extractable salts of the organic cation employed, while the treated clays of Examples 3 and 4 have a relatively high chloride and/or high content of extractable salts of organic cations.

D(ND), a low molecular weight m-xylyladipamide polyamide was purchased from Polymer Chemistry Innovations. This material was analyzed by titration of the amine and carboxylate end groups to possess a number average molecular weight of about 3,000 g/mol, and was determined to have an I.V. of about 0.41 dL/g. 21.1% by weight of the oligomeric poly(m-xylyladipoyl diamine), 3.9% of the organo-montmorillonite from Nanocor, Inc. represented by Examples 2–4, and 75% by wt. of MXD6-6007 from Mitsubishi Chemical Co. were then extruded on the 57 mm twin screw extruder equipped with a general compounding screw. The barrel and die temperatures were set at about 270 C.

The final materials were analyzed for ash content and the results are listed in Table 1.

The resulting nanocomposite materials of Examples 2–4 were used as the middle layer of co-injected trilayer preforms. Samples were also prepared where MXD6-6007 was used in the middle layer. The inner and outer layers of the trilayer preform were made from Eastman Chemical Company PET 9921W, having about 0.80 dL/g I.V. The nominal thickness of the middle layer was about 10% of the total thickness. The preforms were stretch blow molded on a Sidel SBO 2/3 machine into 16 oz. bottle. The bottle sidewall was cut and the middle layer containing the nanocomposite material for example 2–4 and MXD6-6007 was peeled from the three-layer configuration, and analyzed for haze and oxygen permeability.

The oxygen barrier of the film was then determined by ASTM test method D-3985 at 30° C. and 50% relative humidity with a pure oxygen gas permeant and a nitrogen gas carrier on a Mocon 2/20 oxygen permeability tester. The oxygen permeability values of the middle layer containing the nanocomposite, after 40 hours of testing, are presented in Table 1. The haze of the middle layer is also shown in Table 1. The haze was determined by ASTM test method D-1003.

TABLE 1

| Example | Nanomer Type | Solvent | Cl XRF-wt % Before/After | Oxygen Permeability (cc/100 in² 24 hr atm.) | Ash (%) | Middle Layer Thickness (mils) | Middle Layer Haze |
|---|---|---|---|---|---|---|---|
| 1 | PGC-Q182 | H₂O | 0.41/0.24 | 0.020 | 3.6 | 1.2 | 7.78 |
|   | PGC-Q182 | Ethanol | 0.41/0.05 |  |  |  |  |

TABLE 1-continued

| Example | Nanomer Type | Solvent | Cl XRF- wt % Before/ After | Oxygen Permeability (cc/100 in² 24 hr atm.) | Ash (%) | Middle Layer Thickness (mils) | Middle Layer Haze |
|---|---|---|---|---|---|---|---|
| 2 | NX-039-00A | H₂O | 0.26/0.0 | 0.039 | 2.6 | 1.58 | 12.4 |
|   | NX-039-00A | Ethanol | 0.26/0.01 |  |  |  |  |
| 3 | NX-041-00A | H₂O | 1.32/0.92 | 0.10 | 2.1 | 1.68 | 8.1 |
|   | NX-041-00A | Ethanol | 1.32/0.0 |  |  |  |  |
| 4 | NA-047-00 | H₂O | 1.30/0.68 | 0.082 | 2.2 | 1.63 | 8.6 |
|   | NA-047-00 | Ethanol | 1.30/0.03 |  |  |  |  |

As can be seen from Table 1, the nanocomposites having relatively low chloride and/or extractable salts of the organic cations had unexpectedly superior gas permeability, as compared to nanocomposites comprising treated layered clay materials having relatively high contents of chlorides, including extractable salts of the organic cations.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A process for preparing a cation-exchanged intercalate having a decreased level of extractable cations without washing excess cations from the intercalate after ion-exchange comprising the step of:

containing a layered clay material with an organic cation after analysis of the clay material to determine an amount of said organic cation within the range of 0.95 and 1.05 moles of organic cation for each mole of exchangeable cations in the layered clay material, wherein the moles of exchangeable cations in the layered clay is determined empirically in order to approximate an equimolar quanity of organic cation to intercalate into the clay by titrating the clay with an organic cationic indicator that cation-exchanges with the exchangeable cations in the clay and provides an indication when all exchangeable cations have been ion-exchanged with cations from the indicator.

2. The process of claim 1, further including the step of intercalating the cation-exchanged layered clay material with an oligomer or polymer intercalant.

3. The process of claim 1, wherein the oligomer or polymer intercalant is intercalated into the layered clay material in a batch mixing or a melt compounding extrusion process.

4. The process of claim 1 further including the step of shearing the intercalate in a suitable carrier to delaminate the intercalate such that at least 50 percent of the layered clay material is dispersed in the form of individual platelet particles and tactoids and the individual platelet particles have a thickness of less than 2 nm and a diameter of from about 10 to about 3000 nm.

5. The process of claim 1, further including the step of extracting any excess cations from the organic cation-contacted layered material to determine by trial and error if an amount of organic cations intercalated into the layered clay material should be raised or lowered from the approximate cation amount determined by titration.

6. The process of claim 1, further including the steps of incrementally raising or lowering the amount of organic cations intercalated into the layered clay material and analyzing the layered clay material for excess cations until the amount of cations added to the layered clay material for intercalation is in the range of 0.95 to 1.05 moles of organic cation for each mole of exchangeable cations in the layered clay material.

7. The product made by the process of claim 2.
8. The product made by the process of claim 3.
9. The product made by the process of claim 4.
10. The product made by the process of claim 5.
11. The product made by the process of claim 6.
12. A cation-exchanged intercalate that is prepared by the process of claim 1.
13. The intercalate of claim 12, wherein the organic cation is an onium salt.
14. The intercalate of claim 12, wherein the organic cation has the formula

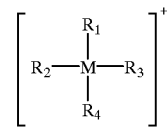

wherein M is either nitrogen or phosphorous, and $R_1$, $R_2$, $R_3$, and $R_4$ are independently organic and/or oligomeric ligands or may be hydrogen.

15. The intercalate of claim 14, wherein the organic cation is an ammonium salt.

16. The intercalate of claim 12, wherein the cation-exchanged layered clay material is intercalated with an intercalant oligomer or polymer selected from the group consisting of a polyester, polyetherester, polyamide, polyesteramide, polyurethane, polyimide, polyetherimide, polyurea, polyamideimide, polyphenyleneoxide, phenoxy resin, epoxy resin, polyolefin, polyacrylate, polystyrene, polyethylene-co-vinyl alcohol, a copolymer thereof, and a mixture thereof.

17. The intercalate of claim 16, wherein polymer intercalant comprises a partially aromatic polymide, aliphatic polyamide, wholly aromatic polyamide or a mixture thereof.

18. The intercalate of claim 16, wherein the polymer intercalant comprises poly(m-xylylene adipamide) or a copolymer thereof, isophthalic acid-modified poy(m-xylylene adipamide), nylon-6, nylon-6,6 or a copolymer thereof, EVOH or a mixture thereof.

19. The intercalate of claim 12, wherein the layered clay material comprises montmorillonite, hectorite, mica, vermiculite, bentonite, nontronite, beidellite, volkonskoite, saponite, magadite, kenyaite, or a mixture thereof.

20. The intercalate of claim 12, wherein the layered clay material comprises sodium montmorillonite sodium bentonite.

21. An exfoliate made by delaminating the intercalate of claim 12 such that at least 50 percent of the layered clay material is dispersed in the form of individual platelet particles and tactoids in a carrier and the individual platelet particles have a thickness of less than 2 nm and a diameter of from about 10 to about 3000 nm.

* * * * *

UNITED STATES PATENT AND TRADEMARK OFFICE
CERTIFICATE OF CORRECTION

PATENT NO. : 6,828,370 B2
DATED : December 7, 2004
INVENTOR(S) : Tie Lan et al.

It is certified that error appears in the above-identified patent and that said Letters Patent is hereby corrected as shown below:

Title page,
Item [57], ABSTRACT,
Line 1, delete "invetion" and insert -- invention --.
Line 2, delete "polymer" and insert -- polymer --.
Line 5, delete "derected" and insert -- directed --.

Column 25,
Line 42, delete "containing" and insert -- contacting --.
Lines 59 and 63, delete "claim 1" and insert -- claim 2 --.

Column 26,
Line 24, delete "claim 1" and insert -- claim 5 --.

Column 28,
Line 2, insert -- or -- between "montmorillonite" and "sodium".

Signed and Sealed this

Nineteenth Day of July, 2005

JON W. DUDAS
*Director of the United States Patent and Trademark Office*